US007895436B2

(12) United States Patent
Imai et al.

(10) Patent No.: US 7,895,436 B2
(45) Date of Patent: Feb. 22, 2011

(54) AUTHENTICATION SYSTEM AND REMOTELY-DISTRIBUTED STORAGE SYSTEM

(75) Inventors: Hideki Imai, Yokohama (JP); Kazukuni Kobara, Tokyo (JP); Seonghan Shin, Tokyo (JP)

(73) Assignee: The Foundation for the Promotion of Industrial Science (JP)

( * ) Notice: Subject to any disclaimer, the term of this patent is extended or adjusted under 35 U.S.C. 154(b) by 1338 days.

(21) Appl. No.: 10/577,111

(22) PCT Filed: Oct. 7, 2004

(86) PCT No.: PCT/JP2004/015184

§ 371 (c)(1),
(2), (4) Date: Apr. 25, 2006

(87) PCT Pub. No.: WO2005/041474

PCT Pub. Date: May 6, 2005

(65) Prior Publication Data

US 2007/0061572 A1 Mar. 15, 2007

(30) Foreign Application Priority Data

Oct. 28, 2003 (JP) .............................. 2003-367527

(51) Int. Cl.
*H04L 9/32* (2006.01)
*H04L 29/06* (2006.01)
(52) U.S. Cl. ........................ 713/169; 713/156; 713/168; 713/176
(58) Field of Classification Search ................. 713/169, 713/156, 176, 168

See application file for complete search history.

(56) References Cited

U.S. PATENT DOCUMENTS 6,061,799 A * 5/2000 Eldridge et al. ................ 726/20
2004/0158708 A1* 8/2004 Peyravian et al. ........... 713/156

FOREIGN PATENT DOCUMENTS

JP          4-245287 A        9/1992

(Continued)

OTHER PUBLICATIONS

Kazukuni Kobara and Hideki Imai, "Pretty-Simple Password-Authenticated Key-Exchange Protocol Proven to be Secure in the Stan- (Continued)

*Primary Examiner*—Shin-Hon Chen
(74) *Attorney, Agent, or Firm*—Ostrolenk Faber LLP

(57) ABSTRACT

An authentication system for mutual authentication between a terminal and a server characterized by the fact that the terminal comprises a memory means that pre-stores an authentication information P' for terminal storage; a concatenation means that yields a value P using a specific calculation formula with the input of the authentication information P' read from the memory means and a password entered for authentication; a mask operation means that yields a value Y1 using a specific calculation formula with the input of value P and an internally generated random number, and then sends Y1 to the server; and a master key generation means that yields a value MK using a specific calculation formula with the input of value P, an internally generated random number and a value Y2 received from the server, and the server comprises a memory means that pre-stores a password verification data H for server registration; a mask operation means that yields a value Y2 using a specific calculation formula with the input of the password verification data H read from the memory means and an internally generated random number, and then sends Y2 to the terminal; and a master key generation means that yields a value MK using a specific calculation formula with the input of the password verification data H, an internally generated random number and a value Y1 received from the terminal.

50 Claims, 22 Drawing Sheets

FOREIGN PATENT DOCUMENTS

| | | |
|---|---|---|
| JP | 2002-208925 | 7/2002 |
| WO | WO 02/060119 A1 | 8/2002 |

OTHER PUBLICATIONS dard Model", IEICE Transactions on Fundamentals of Electronics, Communication and Computer Sciences, vol. E85-A, No. 10, Oct. 1, 2002, pp. 2229-22237.

SeongHan Shin, Kazukuni Kobara, Hideki Imai, "A New Password-based Authentication Protocol", Computer Security Symposium 2003 (CSS2003), Information Processing Society of Japan, vol. 2003, No. 15, Oct. 29, 2003 pp. 7-12.

A Frier, P. Karlton, and P. Kocher. The SSL 3.0 Protocol. Netscape Communication Corp., 1996, http://wp.netscape.com/eng/ssl3/.

International Search Report PCT/JP2004/015184 dated Dec. 10, 2004.

Japanese Office Action mailed Sep. 14, 2010 in corresponding Japanese Patent Application No. 2005-514934.

Muxiang Zhang, "New Approaches to Password Authenticated Key Exchange Based on RSA," LNCS, Dec. 2004, vol. 3329, pp. 230-244, Advances in Cryptology-ASIA CRYPT 2004.

Kazukuni Kobara and Hideki Imal "Pretty-Simple Password-Authenticated Key-Exchange Protocol Proven to be Secure in the Standard Model", IEICE Transactions on Fundamentals of Electronics Communication and Computer Sciences, vol. E85-A, No. 10, Oct. 1, 2002, pp. 2229-2237.

* cited by examiner

TERMINAL (INITIALIZATION)

AUTHENTICATION SYSTEM AND REMOTELY-DISTRIBUTED STORAGE SYSTEM

CROSS REFERENCE TO RELATED APPLICATION

The present application is a 35 U.S.C. §371 national phase conversion of PCT/JP2004/05184 filed Oct. 7, 2004 which claims priority to Japanese Patent Application No: 2003-367527 filed Oct. 28, 2003, which is herein incorporated by reference. The PCT International Application was published in the Japanese Language.

BACKGROUND OF THE INVENTION

1. Technical Field

The present invention includes an authentication system, which is resilient against leakage of information related to authentication, and a remotely-distributed storage system using the authentication system for secure data storage.

The present application claims the priority of Patent Application No. 2003-367527 filed on Oct. 28, 2003, the contents of which are incorporated herein by reference.

2. Description of the Related Art

One of the well-known authentication methods so far is to use a user ID and a password that is known only by the user between a user terminal and a server. In order to authenticate each other in these methods, the user enters his/her ID and password into the terminal and if they match with information stored in the server the user is authenticated as a legitimate user.

However, if these information are sent clearly on the communication path between the terminal and the server an attacker, who gets the information (ID and password) illegally or by eavesdropping the channel, can impersonate the user or do wrongdoings easily. Therefore, encryption techniques such as SSL (Document 1), TLS (Document 2), and SSH (Document 3) are usually used for sending/receiving these information. For authentication, the techniques make use of a combination of passwords, secret values, and public values.

(Document 1) A. Frier, P. Karlton, and P. Kocher. The SSL 3.0 Protocol.Netscape Communication Corp., 1996, http://wp.netscape.com/eng/ss 13/

(Document 2) IETF (Internet Engineering Task Force). Transport Layer Security (tls) Charter.http://www.ietf.org/html.charters/tls-charter.html (Document 3) IETF (Internet Engineering Task Force). Secure Shell (secsh) Charter.http://www.ietf.org/html.charters/secsh-charter.html However, a problem existing within the above non-patent Documents 1 to 3 is that password can be obtained through off-line dictionary attacks when password-encoded (or password-related) information is leaked from a user terminal or password verification data is leaked from a server. As for on-line dictionary attacks (e.g., repeated inputs of password candidates for the correct one by impersonating a user or a server), a server can take a security policy by denying access after the specified number of wrong password inputs. Compared to on-line attacks, off-line dictionary attacks are much more powerful in that there is no available precaution and an attacker can find the correct password without interaction with a user or a server. In addition, if a password is leaked out, the data stored in the system to which a user can log in using the password can be exposed as well.

SUMMARY OF THE INVENTION

A purpose of the present invention is to design an authentication system that can provide not only resilience against information leakage but also establishment of session keys for secure subsequent communications.

A purpose of the present invention is to design a remotely-distributed storage system using the authentication system of the present invention for secure data storage.

The essence of the present invention relates to an authentication system for mutual authentication between a terminal and a server. The terminal comprises of a data extension means that yields password verification data H for server registration and authentication information P' for memory 12 based on a password previously-determined by the user; a memory means that stores the authentication information P' yielded by the data extension means; a concatenation means that yields a value P using a specific calculation formula with the input of the authentication information P' read from the memory and a password entered for authentication; a mask operation means that yields a value Y1 using a specific calculation formula with the input of the value P and an internally generated random number R1, and sends Y1 to the sever; a master key generation means that yields a value MK using a specific calculation formula with the input of the value P and the internally generated random number R1 and a value Y2 received from the server; and an authentication result verification means that yields a value V1 using a specific calculation formula with the input of the value MK, sends V1 to the server, and then compares a value V2 received from the server with the value V1 and, if they match, authenticates the server. The server comprises of a memory means that stores the password verification data H yielded by the data extension means; a mask operation means that yields a value Y2 using a specific calculation formula with the input of the password verification data H read from the memory means and an internally generated random number R2 and sends Y2 to the terminal; a master key generation means that yields a value MK using a specific calculation formula with the input of the password verification data H, the internally generated random number R2 and a value Y1 received from the terminal; and an authentication result verification means that yields a value V2 using a specific calculation formula with the input of the value MK, sends V2 to the terminal and then compares a value V1 received from the terminal with the value V2 and, if they match, authenticates the terminal.

The essence of the present invention relates to an authentication program that runs on the terminal of an authentication system for mutual authentication between the terminal and a server. The program allows a computer to execute a data extension process to yield password verification data H for server-registration and authentication information P' for memory 12 based on a password previously-determined by the user; a memory process to store the authentication information P' yielded in the data extension process; a concatenation process to yield a value P using a specific calculation formula with the input of the authentication information P' stored in the memory process and a password entered for authentication; a mask operation process to yield a value Y1 using a specific calculation formula with the input of the value P and an internally generated random number R1 and send Y1 to the server; a master key generation process to yield a value MK using a specific calculation formula with the input of the value P and the internally generated random number R1 and a value Y2 received from the server; and an authentication result verification process to yield a value V1 using a specific calculation formula with the input of the value MK and send V1 to the server, and then compare a value V2 received from the server with the value V1 and, if they match, authenticate the server.

The essence of the present invention relates to an authentication program that runs on the server of an authentication system for mutual authentication between a terminal and the server. The program allows a computer to execute a memory process to store password verification data H; a mask operation process to yield a value Y2 using a specific calculation formula with the input of the password verification data H stored in the memory process and an internally generated random number R2 and send Y2 to the terminal; a master key generation process to yield a value MK using a specific calculation formula with the input of the password verification data H and the internally generated random number R2 and a value Y1 received from the terminal; and an authentication result verification process to yield a value V2 using a specific calculation formula with the input of the value MK, send V2 to the terminal and then compare a value V1 received from the terminal with the value V2 and, if they match, authenticate the terminal.

The essence of the present invention relates to an authentication system for mutual authentication between a terminal and a server. The terminal comprises of a data extension means that yields password verification data H for server registration and authentication information P' for memory 12; a memory means that stores the authentication information P' yielded by the data extension means and an RSA public key (N, e) yielded by an RSA key generation means; a concatenation means that yields a value W using a specific calculation formula with the input of the authentication information P' read from the memory means and a password entered for authentication; a mask operation means that yields a value Z using a specific calculation formula with the input of the value W, RSA public key (N, e) read from the memory means and an internally generated random number T, and sends Z to the server; an authentication result verification means that compares a value V2 received from the server with a value V2 obtained using a specific calculation formula with the input of the random number T and, if they match, authenticates the server; and a verifier generation means that yields a value V1 using a specific calculation formula with the input of the random number T and sends V1 to the server. The server comprises of an RSA key generation means that yields an RSA public key (N, e) and an RSA private key (N, d); a memory means that stores the RSA private key (N, d) yielded by the RSA key generation means and the password verification data H yielded by the data extension means; a master key generation means that yields a value T using a specific calculation formula with the input of the RSA private key (N, d), password verification data H read from the memory means and a value Z received from the terminal; a verifier generation means that yields a value V2 using a specific calculation formula with the input of the value T and sends V2 to the terminal; and an authentication result verification means that compares a value V1 received from the terminal with a value V1 obtained using a specific calculation formula with the input of the value T and, if they match, authenticates the terminal.

The essence of the present invention relates to an authentication program that runs on the terminal of an authentication system for mutual authentication between the terminal and a server. The program allows a computer to execute a data extension process to yield password verification data H for server registration and authentication information P' for memory 12 based on a password previously-determined by the user; a memory process to store the authentication information P' yielded in the data extension process and an RSA public key (N, e) generated in an RSA key generation process; a concatenation process to yield a value W using a specific calculation formula with the input of the authentication information P' stored in the memory process and a password entered for authentication; a mask operation process to yield a value Z using a specific calculation formula with the input of the value W. RSA public key (N, e) stored in the memory process and an internally generated random number T, and send Z to the server; an authentication results verification process to compare a value V2 received from the server with a value V2 obtained using a specific calculation formula with the input of the random number T and, if they match, authenticate the server; and a verifier generation process to yield a value V1 using a specific calculation formula with the input of the random number T and send V1 to the server.

The essence of the present invention relates to an authentication program that runs on the server of an authentication system for mutual authentication between a terminal and the server. The program allows a computer to execute an RAS key generation process to yield an RAS public key (N, e) and an RAS private key (N, d); a memory process to store the RAS private key (N, d) yielded in the RAS key generation process and password verification data H; a master key generation process to yield a value T using a specific calculation formula with the input of the RAS private key (N, d), password verification data H stored in the memory process and a value Z received from the terminal; a verifier generation process to yield a value V2 using a specific calculation formula with the input of the value T and send V2 to the terminal; and an authentication results verification process to compare a value V1 received from the terminal with a value V1 obtained using a specific calculation formula with the input of the value T and, if they match, authenticate the terminal.

The essence of the present invention relates to a remotely-distributed storage system that conducts mutual authentication between a terminal and multiple servers, distributes terminal data to be stored, and stores them in the servers. The terminal comprises of a data extension means that yields password verification data H for server registration and authentication information P' for memory 12 based on a password previously-determined by the user; a memory means that stores the authentication information P' yielded by the data extension means; a concatenation means that yields a value P using a specific calculation formula with the input of the authentication information P' read from the memory means and a password entered for authentication; a mask operation means that yields a value Y1 using a specific calculation formula with the input of the value P, an internally generated random number R1 and sends Y1 to the server; a master key generation means that yields a value MK using a specific calculation formula with the input of the value P, an internally generated random number R1 and a value Y2 received from the server; an authentication result verification means that yields a value V1 using a specific calculation formula with the input of the value MK, sends V1 to the server and then compares a value V2 received from the server with the value V1 and, if they match, authenticates the server; a session key generation means that generates the same number of session keys SK as the number of servers when the servers are authenticated; a data division means that divides the data to be stored and yields the same number of divided data as the number of authenticated servers; an encoding means that encodes both the respective divided data and identification information for identifying the data to be stored using the session keys SK shared with the storage servers, and sends them to the respective servers; and a data decoding means that receives the divided data from the respective storage servers and decodes the stored data. The servers comprises of a memory means that stores the password verification data H yielded by the data extension means; a mask operation means that yields a value Y2 using a specific calculation formula with the input of the password verification data H read from the memory means and an internally generated random number R2 and sends Y2 to the terminal; a master key generation means that yields a value MK using a specific calculation formula with the input of the password verification data H, an internally generated random number R2 and a value Y1 received from the terminal; an authentication results verification means that yields a value V2 using a specific calculation formula with the input of the value MK, sends V2 to the terminal and then compares a value V1 received from the terminal with the value V2 and, if they match, authenticates the terminal; a session key generation means that generates a session key SK when the terminal is authenticated; a data reception means that receives divided data from the terminal; a data storage means that stores the divided data; and a data transfer means that reads the divided data stored by the data storage means and sends the data to the terminal.

The essence of the present invention relates to a remotely-distributed storage program that runs on the terminal of a remotely-distributed storage system and conducts mutual authentication between the terminal and multiple servers, distributes terminal data to be stored, and stores them in the servers. The program allows a computer to execute a data extension process to yield password verification data H for server registration and authentication information P' for memory 12 based on a password previously-determined by the user; a memory process to store the authentication information P' yielded by the data extension means; a concatenation process to yield a value P using a specific calculation formula with the input of the authentication information P' read from the memory process and a password entered for authentication; a mask operation process to yield a value Y1 using a specific calculation formula with the input of the value P and an internally generated random number R1, and send Y1 to the server; a master key generation process to yield a value MK using a specific calculation formula with the input of the value P, internally generated random number R1 and a value Y2 received from the server; an authentication results verification process to yield a value V1 using a specific calculation formula with the input of the value MK, send V1 to the server and then compare a value V2 received from the server with the value V1 and, if they match, authenticate the server; a session key generation process to generate the same number of session keys SK as the number of servers when the servers are authenticated; a data division process to divide the data to be stored and yield the same number of divided data as the number of authenticated servers; a data encoding process to encode both the respective divided data and identification information for identifying the data to be stored using the session keys SK shared with the storage servers and send them to the respective servers; and a data decoding process to receive the divided data from the respective storage servers and decode the stored data.

The essence of the present invention relates to a remotely-distributed storage program that runs on the server of a remotely-distributed storage system and conducts mutual authentication between a terminal and multiple servers, distributes terminal data to be stored, and stores it in the servers. The program allows a computer to execute a memory process to store password verification data H yielded in a data extension process; a mask operation process to yield a value Y2 using a specific calculation formula with the input of the password verification data H read from the memory process and an internally generated random number R2, and send Y2 to the terminal; a master key generation process to yield a value MK using a specific calculation formula with the input of the password verification data H, an internally generated random number R2 and a value Y1 received from the terminal; an authentication result verification process to yield a value V2 using a specific calculation formula with the input of the value MK, send V2 to the terminal and then compare a value V1 received from the terminal with the value V2 and, if they match, authenticate the terminal; a session key generation process to generate a session key when the terminal is authenticated; a data reception process to receive the divided data from the terminal; a data storage process to store the divided data; and a data transfer process to read the divided data stored in the data storage process and send the data to the terminal.

DETAILED DESCRIPTION OF THE PREFERRED EMBODIMENTS

Embodiment 1

Hereinafter, preferred embodiments of the present invention are described along with reference to the drawings. However, the present invention is not restricted to the following embodiments. For example, components of the following embodiments can be combined in an appropriate way for another embodiment.

The authentication system to be described here is a system that allows a user terminal and an authentication server to authenticate mutually and share the same session key at the same time.

Here are symbols to be used in the explanation.

The letters p and q are prime numbers, satisfying the relationship of q|p−1, q|p−1 means that q is a divisor of p−1. The letters g and h are generators of a finite field (group) $G=\{g^j \mod p: 0 \leq j < q\}$ with order q over modulus p (which can be constructed in the same way over an elliptic curve group). Here, "$g^j \mod p$" is a modulus exponential operation in which g is raised to j and divided by p to yield a remainder. Here, g satisfies ($1 < g < p-1$, $g^q = 1 \mod p$, $g^j \neq 1 \mod p$ ($0 < j < q$)) and h satisfies $h = g^\alpha \mod p$. In other words, p and q represent an operation system (characteristics of the prime field). For example, x is a secret information in $H = h^x \mod p$ ($0 < x < q$) (in other words, if h and H are given, it is mathematically difficult to compute $x = \log_h H$; the discrete logarithm problem for a generator h of H). A random number generator chooses randomly a number $R \in (Z/qZ)^*$ where $(Z/qZ)^*$ is a set $\{1, 2, \ldots, q\}$. N is the length of a password. ∥ means that the values are concatenated (concatenation).

<Terminal Initialization>

Figure 1:
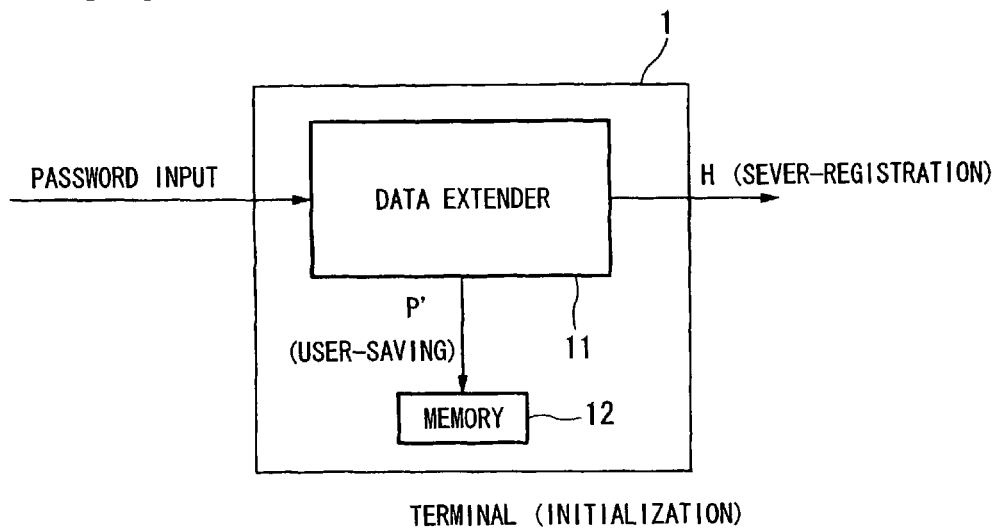
FIG. 1 is a block diagram showing the configuration of a terminal as an embodiment of the present invention.

When a user wants to register to a server, the user initializes his/her own terminal. FIG. 1 is a block diagram showing the configuration of the initialization process of a user terminal. In the initialization, when the user enters a password a data extender 11 generates password verification data H for server registration and a value P' for memory 12. The password verification data H is sent to the server and the value P' is stored in memory 12. The data extender 11 can be constructed by a polynomial equation, a polynomial equation and a hash function, a hash function, or a pseudo random number generator.

(1) Use of Polynomial Equation (1)

Figure 2:
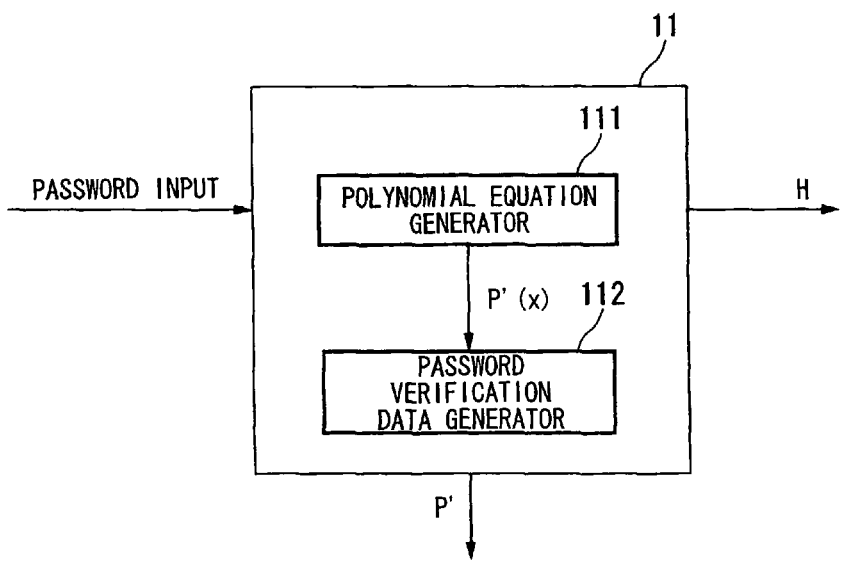
FIG. 2 is a block diagram showing the configuration of the data extender 11 in FIG. 1.

First, use of a polynomial equation (1) is described with reference to FIG. 2.

First, a polynomial equation generator 111 randomly generates a polynomial equation. Here, the polynomial equation generator 111 generates a polynomial equation of degree one with a variable x ($p'(x) = \alpha_1 \cdot x \mod q$) when there is one server for registration and a polynomial equation of degree n ($p'(x) = \alpha_1 \cdot x + \alpha_2 \cdot x^2 + \ldots + \alpha_n \cdot x^n \mod q$) when there are n servers. α is randomly selected from $(Z/qZ)^*$. For example, p'(x) becomes $p'(x) = \alpha_1 \cdot x \mod q$ when there is one server. Then, the user enters a password (for example "Pooh93") remembered in the brain. When receiving the polynomial equation and the user password, password verification data generator 112 generates password verification data H. The password verification data H can be calculated for example as $H = h^{p'(1) + Pooh93} \mod p$ where p'(1) is the resultant value from the calculation of p'(x) with x being replaced by the server ID (for example "1"). The password verification data H needs to be sent to the server in a secure manner where the user gives it to the server administrator directly, by mail, or by telephone. The polynomial equation P' = p'(x) generated by the polynomial equation generator is stored in the memory 12 inside a user terminal.

(2) Use of Polynomial Equation (2)

Next, use of polynomial equation (2) is described hereinafter with reference to FIG. 2.

First, the polynomial equation generator 111 randomly generates a polynomial equation. Here, the polynomial equation generator 111 generates a polynomial equation of degree one with a variable x ($p'(x) = \alpha_1 \cdot x \mod q$) when there is one server for registration and a polynomial equation of degree n ($p'(x) = \alpha_1 \cdot x + \alpha_2 \cdot x^2 + \ldots + \alpha_n \cdot x^n \mod q$) when there are n servers. α is randomly selected from $(Z/qZ)^*$. For example, p'(x) becomes $p'(x) = \alpha_1 \cdot x \mod q$ when there is one server. Then, the user enters a password (for example "Pooh93") remembered in the brain. When receiving the polynomial equation and the user password, the password verification data generator 112 generates password verification data H. The password verification data H can be calculated for example as $H = p(1) = p'(1) + Pooh93 \mod q$ where p'(1) is the resultant value from the calculation of p'(x) with x being replaced by the server ID (for example "1"). The password verification data H needs to be sent to the server in a secure manner where the user gives it to the server administrator directly, by mail, or by telephone. The polynomial equation P' = p'(x) generated by the polynomial equation generator is stored in the memory 12 inside a user terminal.

(3) Use of Polynomial Equation and Hash Function (1)

Figure 8:
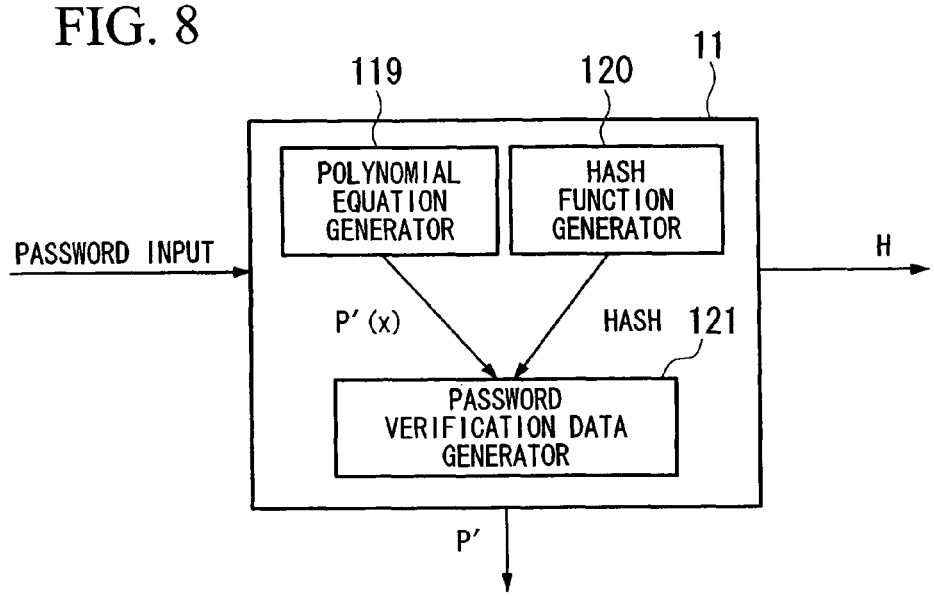
FIG. 8 is a block diagram showing the configuration of the data extender 11 in FIG. 1.

Next, use of polynomial equation and hash function (1) is described hereinafter with reference to FIG. 8.

First, a polynomial equation generator 119 randomly generates a polynomial equation. Here, the polynomial equation generator 119 generates a polynomial equation of degree one with a variable x ($p'(x) = \alpha_1 \cdot x \mod N$) when there is one server for registration and a polynomial equation of degree n ($p'(x) = \alpha_1 \cdot x + \alpha_2 \cdot x^2 + \ldots + \alpha_n \cdot x^n \mod N$) when there are n servers. α is randomly selected from $(Z/qZ)^*$. For example, p'(x) becomes $p'(x) = \alpha_1 \cdot x \mod N$ when there is one server. Subsequently, a hash function generator 120 randomly generates a hash function HASH. The HASH is a one-way hash function. Then, the user enters a password (for example "Pooh93") remembered in the brain. When receiving the polynomial equation, the hash function and the user password, the password verification data generator 121 generates password verification data H. The password verification data H can be calculated for example as $H = h^{p(1)} \mod p$ where p(1) is the resultant value by $p(1) = p'(1) + HASH(Pooh93 \| ID(U) \| ID(S)) \mod N$. Here, ID(U) and ID(S) represent a user ID and a server ID, respectively. p'(1) is calculated from p'(x) with x being replaced by "1."

For example, if there are n servers for registration, the password verification data generator 121 generates password verification data H for the i-th server. The password verification data H can be calculated for example as $H=h^{p(i)}$ mod p where p(i) is the resultant value by $p^{(i)}=p'(i)+HASH(Pooh93\|ID(U)\|ID(S))$ mod N. Here, ID(U) and ID(S) represent a user ID and an i-th server ID, respectively. p'(i) is calculated from the polynomial equation p'(x) of degree n with x being replaced by "i."

The password verification data H needs to be sent to the server in a secure manner where the user gives it to the server administrator directly, by mail, or by telephone. The polynomial equation p'(x) generated by the polynomial equation generator and the hash function HASH generated by the hash function generator are stored in the memory 12 within a user terminal together as P'=(p'(x), HASH).

(4) Use of Polynomial Equation and Hash Function (2)

Next, use of polynomial equation and hash function (2) is described hereinafter with reference to FIG. 8.

First, the polynomial equation generator 119 randomly generates a polynomial equation. Here, the polynomial equation generator 119 generates a polynomial equation of degree one with a variable x ($p'(x)=\alpha_1 \cdot x$ mod N) when there is one server for registration and a polynomial equation of degree n ($p'(x)=\alpha_1 \cdot x + \alpha_2 \cdot x^2 + \ldots + \alpha_n \cdot x^n$ mod N) when there are n servers. $\alpha$ is randomly selected from $(Z/qZ)^*$. For example, p'(x) becomes $p'(x)=\alpha_1 \cdot x$ mod N when there is one server. Subsequently, the hash function generator 120 randomly generates the hash function HASH. The HASH is a one-way hash function. Then, the user enters a password (for example "Pooh93") remembered in the brain. When receiving the polynomial equation, the hash function and the user password, the password verification data generator 121 generates password verification data H. The password verification data H can be calculated for example as $H=p(1)=p'(1)+HASH(Pooh93\|ID(U)\|ID(S))$ mod N. Here, ID(U) and ID(S) represent a user ID and a server ID, respectively. p'(1) is calculated from p'(x) with x being replaced by "1."

For example, if there are n servers for registration, the password verification data generator 121 generates password verification data H for the i-th server. The password verification data H can be calculated for example as $H=p(i)=p'(i)+HASH(Pooh93\|ID(U)\|ID(S))$ mod N. Here, ID(U) and ID(S) represent a user ID and an i-th server ID, respectively. p'(i) is calculated from the polynomial equation p'(x) of degree n with x being replaced by "i."

The password verification data H needs to be sent to the server in a secure manner where the user gives it to the server administrator directly, by mail, or by telephone. The polynomial equation p'(x) generated by the polynomial equation generator and the hash function HASH generated by the hash function generator are stored in the memory 12 within a user terminal together as P'=(p'(x), HASH).

(5) Use of Hash Function (1)

Figure 3:
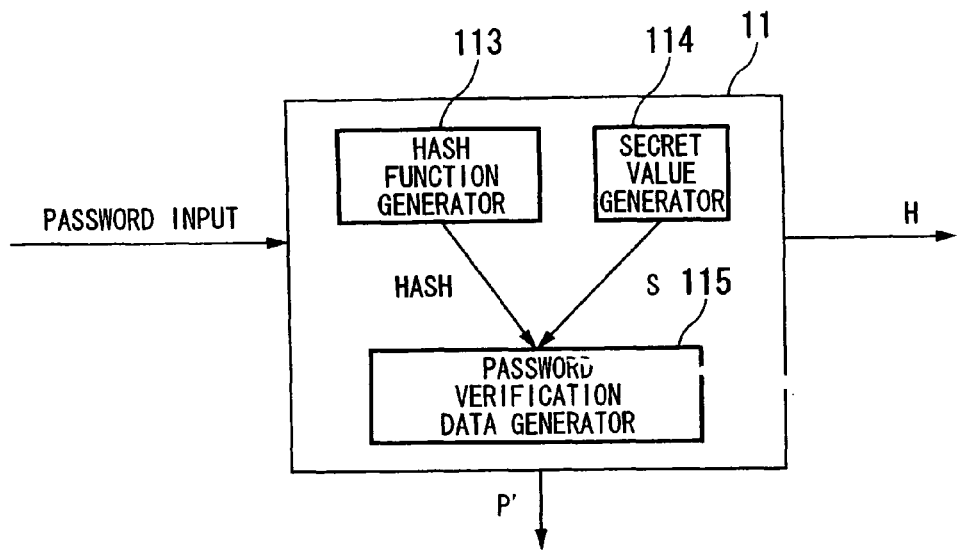
FIG. 3 is a block diagram showing the configuration of the data extender 11 in FIG. 1.

Next, use of hash function (1) is described hereinafter with reference to FIG. 3.

First, a hash function generator 113 randomly generates a hash function HASH. Subsequently, a secret value generator 114 randomly generates a secret value S. The user enters a password (for example "Pooh93") remembered in the brain. When receiving the hash function, the secret value S, and the user password, the password verification data generator 115 generates password verification data H. The password verification data H can be calculated for example as $H=h^{HASH(S\|Pooh93\|ID(U)\|ID(S))}$ mod p. Here, ID(U) and ID(S) represent a user ID and a server ID, respectively. The password verification data H needs to be sent to the server in a secure manner where the user gives it to the server administrator directly, by mail, or by telephone. The hash function HASH and the secret value S generated by hash function generator 113 and secret value generator 114 are stored in the memory 12 within a user terminal together as P'=(S, HASH).

(6) Use of Hash Function (2)

Next, use of hash function (2) is described hereinafter with reference to FIG. 3.

First, the hash function generator 113 randomly generates a hash function HASH. Subsequently, the secret value generator 114 randomly generates a secret value S. Then, the user enters a password (for example "Pooh93") remembered in the brain. When receiving the hash function, the secret value S and user password, the password verification data generator 115 generates password verification data H. The password verification data H can be calculated for example as $H=HASH(S\|Pooh93\|ID(U)\|ID(S))$ mod q. Here, ID(U) and ID(S) represent a user ID and a server ID, respectively. The password verification data H needs to be sent to the server in a secure manner where the user gives it to the server administrator directly, by mail, or by telephone. The hash function HASH and the secret value S generated by hash function generator 113 and secret value generator 114 are stored in the memory 12 within a user terminal together as P'=(S, HASH).

(7) Use of Pseudo Random Number Generator (1)

Figure 4:
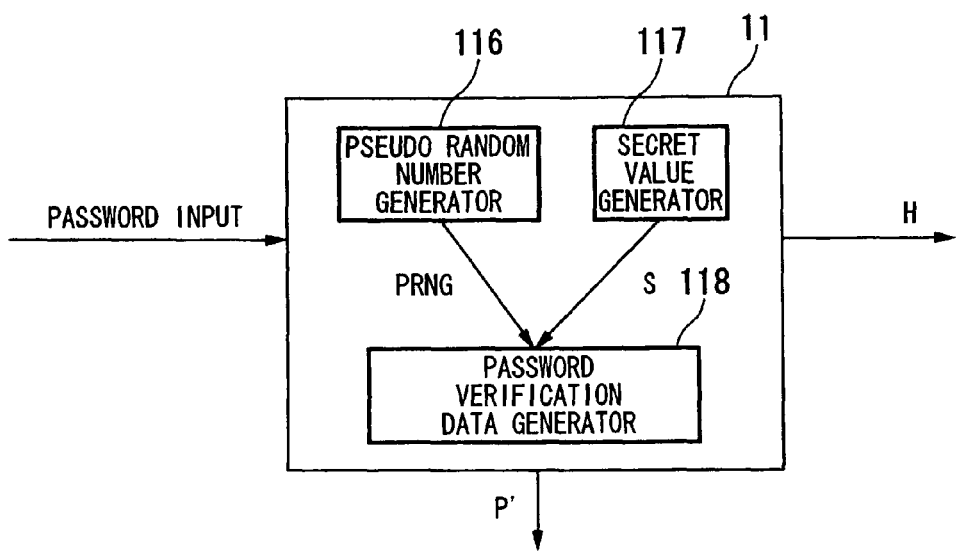
FIG. 4 is a block diagram showing the configuration of the data extender 11 in FIG. 1.

Next, use of pseudo random number generator (1) is described hereinafter with reference to FIG. 4.

First, a pseudo random number generator 116 randomly generates a pseudo random number function PRNG. Subsequently, a secret value generator 117 randomly generates a secret value S. Then, the user enters a password (for example "Pooh93") remembered in the brain. When receiving the pseudo random number function PRNG, the secret value S and the user password, the password verification data generator 118 generates password verification data H. The password verification data H can be calculated for example as $H=h^{PRNG(S\|Pooh93\|ID(U)\|ID(S))}$ mod p. Here, ID(U) and ID(S) represent a user ID and a server ID, respectively. The password verification data H needs to be sent to the server in a secure manner where the user gives it to the server administrator directly, by mail, or by telephone. The pseudo random number function PRNG and the secret value S generated by pseudo random number generator 116 and secret value generator 117 are stored in the memory 12 within a user terminal together as P'=(S, PRNG).

(8) Use of Pseudo Random Number Generator (2)

Next, use of pseudo random number generator (2) is described hereinafter with reference to FIG. 4.

First, the pseudo random number generator 116 randomly generates a pseudo random number function PRNG. Subsequently, the secret value generator 117 randomly generates a secret value S. Then, the user enters a password (for example "Pooh93") remembered in the brain. When receiving the pseudo random number function PRNG, the secret value S and the user password, the password verification data generator 118 generates password verification data H. The password verification data H can be calculated for example as $H=PRNG(S\|Pooh93\|ID(U)\|ID(S))$ mod q. Here, ID(U) and ID(S) represent a user ID and a server ID, respectively. The password verification data H needs to be sent to the server in a secure manner where the user gives it to the server administrator directly, by mail, or by telephone. The pseudo random number function PRNG and the secret value S generated by pseudo random number generator 116 and secret value generator 117 are stored in the memory 12 within a user terminal together as P'=(S, PRNG).

Figure 5:
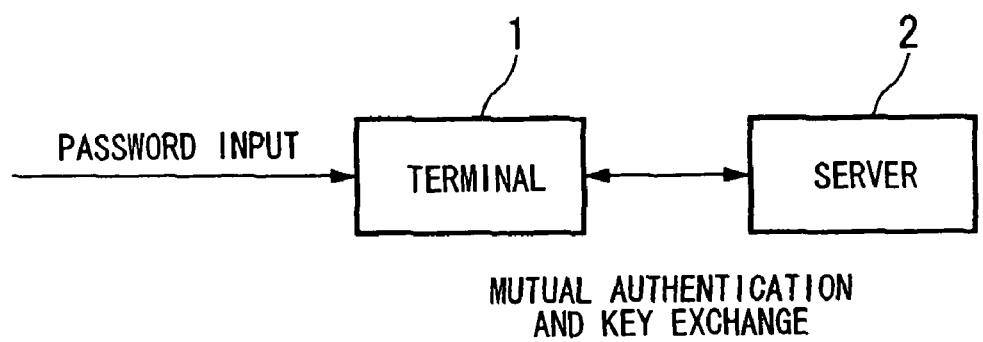
FIG. 5 is a block diagram showing the configuration of a mutual authentication and key exchange unit.
Figure 6:
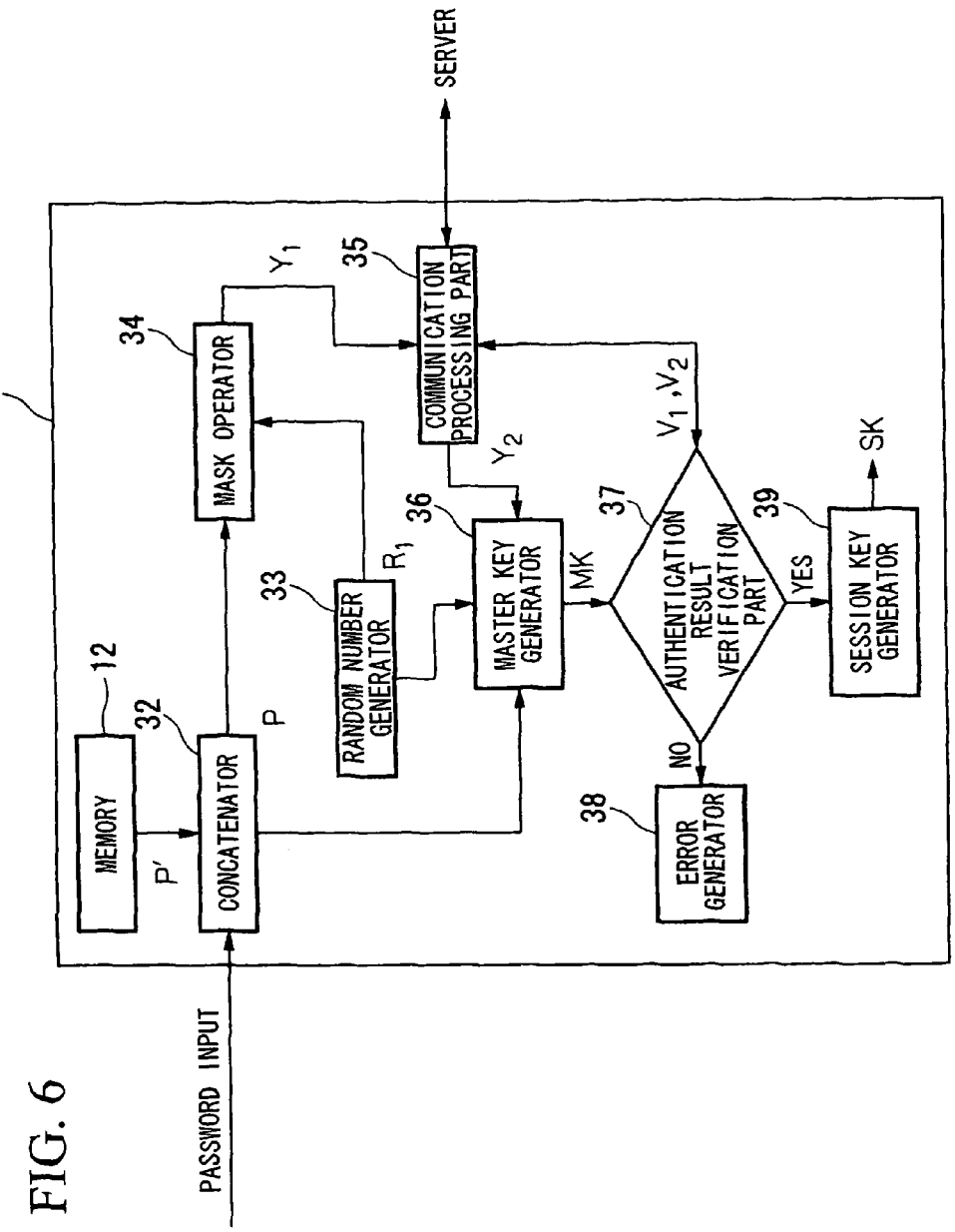
FIG. 6 is a block diagram showing the configuration of the terminal 1 in FIG. 5.
Figure 7:
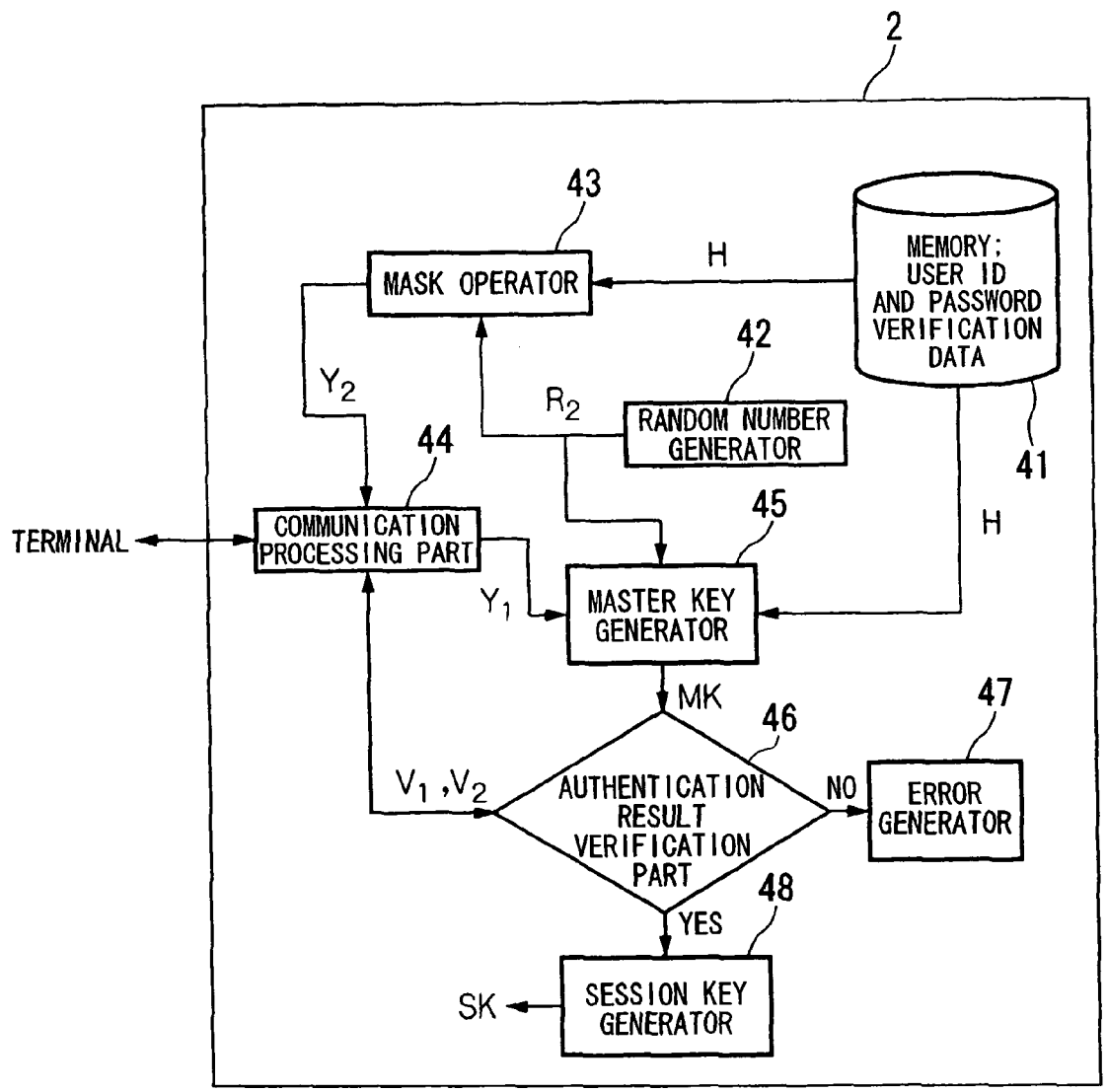
FIG. 7 is a block diagram showing the configuration of the server 2 in FIG. 5.

Hereinafter, mutual authentication and key exchange operations between the terminal 1 initialized as above and a server 2 (see FIG. 5) are described with reference to FIGS. 6 and 7.

<Terminal Operation>

(1) Use of Polynomial Equation (1 and 2)

First, operation of the terminal 1 when initialized using polynomial equation is described. The terminal 1 operates as follows regardless of using a polynomial equation (1) or a polynomial equation (2) described above.

First, a polynomial equation P'=p'(x) stored in the memory 12 within a user terminal 1 is read. A concatenator 32 calculates and outputs P=p(x) using the polynomial equation P' read from the memory 12 and a password entered by the user. For example, the concatenator 32 calculates $p(x)=p'(x)+Pooh93=\alpha_1 \cdot x+Pooh93 \mod q$. A mask operator 34 calculates $Y_1=g^{R1} \cdot h^{-p(1)} \mod p$ using P received from the concatenator 32 and a random number $R_1$ generated by a random number generator 33. Here, p(1) is calculated as $p(1)=p'(1)+Pooh93=\alpha_1 \cdot 1+Pooh93 \mod q$. Here, "1" represents the server ID. A communication processing part 35 sends $Y_1$ to the server 2 and receives $Y_2$ from the server 2. When receiving P from the concatenator 32, $R_1$ from the random number generator 33 and the received $Y_2$, a master key generator 36 calculates and outputs $MK=(Y_2 \cdot h^{-p(1)})^{R1} \mod p$.

Subsequently, with the input of MK an authentication results verification part 37 calculates $V_1$=HASH$(00\|Y_1\|Y_2\|MK)$, sends $V_1$ to the server 2 via the communication processing part 35, and compares $V_2$ received from the server 2 with HASH$(01\|Y_1\|Y_2\|MK)$. Here, the HASH is a one-way hash function and a MAC (Message Authentication Code) can be used instead of HASH.

If $V_2$ and HASH$(01\|Y_1\|Y_2\|MK)$ do not match, the authentication results verification part 37 informs an error generator 38 that there is no match. As the response, the error generator 38 generates an error and terminates the process. On the other hand, if $V_2$ and HASH$(01\|Y_1\|Y_2\|MK)$ match, the authentication results verification part 37 authenticates the server 2 as a legitimate unit and a session key generator 39 generates a session key SK=HASH$(11\|Y_1\|Y_2\|MK)$.

(2) Use of Polynomial Equation and Hash Function (1 and 2)

Next, operation of the terminal 1 when initialized using polynomial equation and hash function is described hereinafter. The terminal 1 operates as follows regardless of using a polynomial equation and a hash function (1) or a polynomial equation and a hash function (2) described above.

First, a polynomial equation and a hash function P'=(p'(x), HASH) stored in the memory 12 within a user terminal 1 is read. The concatenator 32 calculates and outputs P=p(x) using the polynomial equation p'(x) and hash function HASH read from the memory 12 and a password entered by the user. For example, the concatenator 32 calculates $p(x)=p'(x)+HASH(Pooh93\|ID(U)\|ID(S))=\alpha_1 \cdot x+HASH(Pooh93\|ID(U)\|ID(S)) \mod N$ when p'(x) is a polynomial equation of degree one. The mask operator 34 calculates $Y_1=g^{R1} \cdot h^{-p(1)} \mod p$ using P received from the concatenator 32 and a random number $R_1$ generated by the random number generator 33. Here, $p(1)=p'(1)+HASH(Pooh93\|ID(U)\|ID(S))=\alpha_1 \cdot 1+HASH(Pooh93\|ID(U)\|ID(S)) \mod N$. p'(1) is calculated from p'(x) with x being replaced by "1." The communication processing part 35 sends $Y_1$ to the server 2 and receives $Y_2$ from the server 2. When receiving P from the concatenator 32, $R_1$ from the random number generator 33, and the received $Y_2$, the master key generator 36 calculates and outputs $MK=(Y_2 \cdot h^{-p(1)})^{R1} \mod p$.

When the polynomial equation p'(x) read from the memory 12 within a user terminal 1 is a polynomial equation of degree n, the concatenator 32 calculates and outputs P=p(x) using the polynomial equation p'(x) and hash function HASH and a password entered by the user. For example, the concatenator 32 calculates $p(x)=p'(x)+HASH(Pooh93\|ID(U)\|ID(S)) \mod N$. The mask operator 34 calculates $Y_1=g^{R1} \cdot h^{-p(i)} \mod p$ using P received from the concatenator 32 and a random number $R_1$ generated by the random number generator 33. Here, $p(i)=p'(i)+HASH(Pooh93\|ID(U)\|ID(S)) \mod N$. p'(i) is calculated from p'(x) with x being replaced by "i" for the i-th server. The communication processing part 35 sends $Y_1$ to the server 2 and receives $Y_2$ from the server 2. When receiving P from the concatenator 32, $R_1$ from the random number generator 33, and the received $Y_2$, the master key generator 36 calculates and outputs $MK=(Y_2 \cdot h^{-p(i)})^{R1} \mod p$.

Subsequently, with the input of MK the authentication result verification part 37 calculates $V_1$=HASH$(00\|Y_1\|Y_2\|MK)$, sends $V_1$ to the server 2 via the communication processing part 35, and compares $V_2$ received from the server 2 with HASH$(01\|Y_1\|Y_2\|MK)$. Here, the HASH is a one-way hash function and a MAC (Message Authentication Code) can be used instead of HASH.

If $V_2$ and HASH$(01\|Y_1\|Y_2\|MK)$ do not match, the authentication result verification part 37 informs the error generator 38 that there is no match. As the response, the error generator 38 generates an error and terminates the process. On the other hand, if $V_2$ and HASH$(01\|Y_1\|Y_2\|MK)$ match, the authentication results verification part 37 authenticates the server 2 as a legitimate unit and the session key generator 39 generates a session key SK=HASH$(11\|Y_1\|Y_2\|MK)$.

(3) Use of Hash Function (1 and 2)

Next, operation of the terminal 1 when initialized using hash function is described hereinafter. The terminal 1 operates as follows regardless of using a hash function (1) or a hash function (2) described above.

First, a secret value and a hash function P'=(S, HASH) stored in the memory 12 within a user terminal 1 is read. The concatenator 32 calculates and outputs P=p using the secret value S and hash function HASH read from the memory 12 and a password entered by the user. For example, the concatenator 32 calculates $p=HASH(S\|Pooh93\|ID(U)\|ID(S)) \mod q$. The mask operator 34 calculates $Y_1=g^{R1} \cdot h^{-p} \mod p$ using P received from the concatenator 32 and a random number $R_1$ generated by the random number generator 33. The communication processing part 35 sends $Y_1$ to the server 2 and receives $Y_2$ from the server 2. When receiving P from the concatenator 32, $R_1$ from the random number generator 33, and the received $Y_2$, the master key generator 36 calculates and outputs $MK=(Y_2 \cdot h^{-p})^{R1} \mod p$.

Subsequently, with the input of MK the authentication result verification part 37 calculates $V_1$=HASH$(00\|Y_1\|Y_2\|MK)$, sends $V_1$ to the server 2 via the communication processing part 35, and compares $V_2$ received from the server 2 with HASH$(01\|Y_1\|Y_2\|MK)$. Here, the HASH is a one-way hash function and a MAC (Message Authentication Code) can be used instead of HASH.

Then, if $V_2$ and HASH$(01\|Y_1\|Y_2\|MK)$ do not match, the authentication result verification part 37 informs the error generator 38 that there is no match. As the response, the error generator 38 generates an error and terminates the process. On the other hand, if $V_2$ and HASH$(01\|Y_1\|Y_2\|MK)$ match, the authentication result verification part 37 authenticates the server 2 as a legitimate unit and the session key generator 39 generates a session key SK=HASH($11\|Y_1\|Y_2\|MK$).

(4) Use of Pseudo Random Number Generator (1 and 2)

Next, operation of the terminal 1 when initialized using pseudo random number generator is described hereinafter. The terminal 1 operates as follows regardless of using a pseudo random number generator (1) or a pseudo random number generator (2) described above.

The operation when using a pseudo random number generator is the same as when using a hash function except that a pseudo random number generator RPNG is used in the place of the hash function HASH stored in the memory 12 within a user terminal 1. Therefore, a detailed explanation is omitted.

<Server Operation>

(1) Use of Polynomial Equation (1), Use of Polynomial Equation and Hash Function (1), Use of Hash Function (1), and Use of Pseudo Random Number Generator (1)

The server 2 operates as follows regardless of using a polynomial equation (1), a polynomial equation and a hash function (1), a hash function (1), or a pseudo random number generator (1) described above.

A user ID and password verification data H stored in memory 41 within the server 2 are read. After receiving the password verification data H read from the memory 41 and a random number $R_2$ generated by random number generator 42, a mask operator 43 calculates $Y_2=g^{R_2} \cdot H$ mod p. A communication processing part 44 sends $Y_2$ obtained in the calculation to the terminal 1, receives $Y_1$ from the terminal 1 and outputs $Y_1$ to a master key generator 45. After receiving the password verification data H read from the memory 41, $R_2$ from the random number generator 42, and $Y_1$ from the communication processing part 44, the master key generator 45 calculates and outputs MK=$(Y_1 \cdot H)^{R_2}$ mod p.

Subsequently, with the input of MK an authentication result verification part 46 calculates $V_2$=HASH($01\|Y_1\|Y_2\|MK$), sends $V_2$ to the terminal 1 via the communication processing part 44, and compares $V_1$ received from the terminal 1 with HASH($00\|Y_1\|Y_2\|MK$). In this instance, the HASH is a one-way hash function and a MAC (Message Authentication Code) can be used instead of HASH.

If $V_1$ and HASH($00\|Y_1\|Y_2\|MK$) do not match, the authentication result verification part 46 informs the error generator 47 that there is no match. As the response, the error generator 47 generates an error and terminates the process. On the other hand, if $V_1$ and HASH($00\|Y_1\|Y_2\|MK$) match, the authentication result verification part 46 authenticates the terminal 1 as a legitimate unit and a session key generator 48 generates a session key SK=HASH($11\|Y_1\|Y_2\|MK$).

(2) Use of Polynomial Equation (2), Use of Polynomial Equation and Hash Function (2), Use of Hash Function (2), and Use of Pseudo Random Number Generator (2)

The server 2 operates as follows regardless of using a polynomial equation (2), a polynomial equation and a hash function (2), a hash function (2), or a pseudo random number generator (2) described above.

A user ID and a password verification data H stored in memory 41 within the server 2 are read. After receiving the password verification data H read from the memory 41 and a random number R2 generated by the random number generator 42, the mask operator 43 calculates $Y_2=g^{R2} \cdot h^H$ mod p. The communication processing part 44 sends $Y_2$ obtained in the calculation to the terminal 1, receives $Y_1$ from the terminal 1 and outputs $Y_1$ to the master key generator 45. After receiving the password verification data H read from the memory 41, $R_2$ from the random number generator 42, and $Y_1$ from the communication processing part 44, the master key generator 45 calculates and outputs MK=$(Y_1 \cdot h^H)^{R2}$ mod p.

Subsequently, with the input of MK the authentication results verification part 46 calculates $V_2$=HASH($01\|Y_1\|Y_2\|MK$), sends $V_2$ to the terminal 1 via the communication processing part 44, and compares $V_1$ received from the terminal 1 with HASH($00\|Y_1\|Y_2\|MK$). In this instance, the HASH is a one-way hash function and a MAC (Message Authentication Code) can be used instead of HASH.

Then, if $V_1$ and HASH($00\|Y_1\|Y_2\|MK$) do not match, the authentication result verification part 46 informs the error generator 47 that there is no match. As the response, the error generator 47 generates an error and terminates the process. On the other hand, if $V_1$ and HASH($00\|Y_1\|Y_2\|MK$) match, the authentication result verification part 46 authenticates the terminal 1 as a legitimate unit and the session key generator 48 generates the session key SK=HASH($11\|Y_1\|Y_2\|MK$).

<Password Verification Data Update—1>

Figure 9:
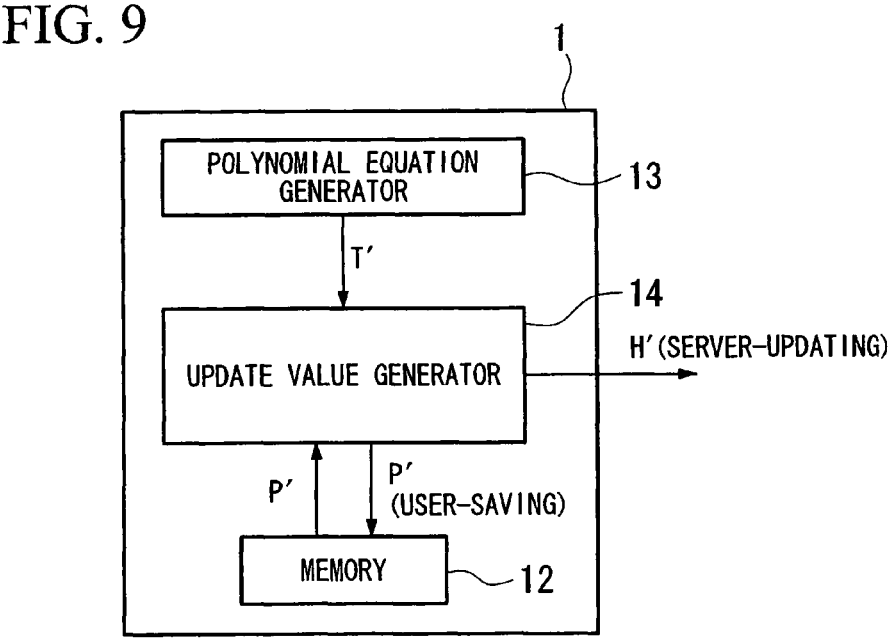
FIG. 9 is a block diagram showing the configuration of the terminal 1 for password verification data update—1.

When a user wants to update the password verification data already registered to a server without changing the password, the user updates his own terminal. FIG. 9 is a block diagram showing the configuration of the user terminal update process. In the update process, after receiving a polynomial equation T' from a polynomial equation generator 13 and a polynomial equation P' stored in the memory 12 within the user terminal 1, an update value generator 14 generates the value H' for server update and updated polynomial equation P' for memory 12 where H' is sent to the server and the updated polynomial equation P' is stored in memory 12. The update process is applicable to the use of polynomial equation (1), polynomial equation (2), polynomial equation and hash function (1), and polynomial equation and hash function (2) described above.

<Terminal Update Process>

(1) Use of Polynomial Equation (1)

First, update process of the terminal 1 when initialized using polynomial equation (1) is described hereinafter, with reference to FIG. 9.

First, the polynomial equation generator 13 randomly generates a polynomial equation. In this instance, the polynomial equation generator 13 generates a polynomial equation of degree one with a variable x(t'(x)=$\beta_1 \cdot x$ mod q) when there is one registered server and polynomial equation of degree n(t'(x)=$\beta_1 \cdot x + \beta_2 \cdot x^2 + \ldots + \beta_n \cdot x^n$ mod q) when there are n servers. $\beta$ is randomly selected from $(Z/qZ)^*$. For example, T' becomes T'=t'(x)=$\beta_1 \cdot x$ mod q when there is one server. Then, the polynomial equation P'=p'(x) stored in the memory 12 within user terminal 1 is read. After receiving the polynomial equations t'(x) and p'(x), the update value generator 14 generates the updated polynomial equation P' for memory 12 and the value H' for server update. The updated polynomial equation P' can be calculated for example as P'=t'(x)+p'(x)=$(\alpha_1 + \beta_1) \cdot x$ mod q. The value H' for server update can be calculated for example as H'=$h^{t'(1)}$ mod p. In this instance, t'(1) is the resultant value from t'(x) with x being replaced by the server ID (for example "1"). The value H' for server update needs to be sent to the server in a secure manner where the user gives it to the server administrator directly, by mail, or by telephone. The updated polynomial equation P'=t'(x)+p'(x) is stored in memory 12 within the user terminal.

(2) Use of Polynomial Equation (2)

Next, update process of the terminal 1 when initialized using polynomial equation (1) is described hereinafter with reference to FIG. 9.

First, the polynomial equation generator 13 randomly generates a polynomial equation. In this instance, the polynomial equation generator 13 generates a polynomial equation of degree one with a variable x ($t'(x)=\beta_1 \cdot x \mod q$) when there is one registered server and polynomial equation of degree n ($t'(x)=\beta_1 \cdot x+\beta_2 \cdot x^2+ \ldots +\beta_n \cdot x^n \mod q$) when there are n servers. $\beta$ is randomly selected from $(Z/qZ)^*$. For example, T' becomes $T'=t'(x)=\beta_1 \cdot x \mod q$ when there is one server. Then, the polynomial equation $P'=t'(x)=\beta_1 \cdot x \mod q$ when there is one server. Then, the polynomial equation $P'=t'(x)=p'(x)$ stored in the memory 12 within user terminal 1 is read. After receiving the polynomial equations t'(x) and p'(x), the update value generator 14 generates an updated polynomial equation P' for memory 12 and a value H' for server update. The updated polynomial equation P' can be calculated, for example by $P'=t'(x)+p'(x)=(\alpha_1+\beta_1) \cdot x \mod q$. The value H' for server update can be calculated for example by $H'=t'(1) \mod q$. In this instance, t'(1) is the resultant value from t'(x) with x being replaced by the server ID (for example "1"). The value H' for server update needs to be sent to the server in a secure manner where the user gives it to the server administrator directly, by mail, or by telephone. The updated polynomial equation $P'=t'(x)+p'(x)$ is stored in the memory 12 within the user terminal.

(3) Use of Polynomial Equation and Hash Function (1)

Next, update process of the terminal 1 when initialized using polynomial equation and hash function (1) is described hereinafter with reference to FIG. 9.

First, the polynomial equation generator 13 randomly generates a polynomial equation. In this instance, the polynomial equation generator 13 generates a polynomial equation of degree one with a variable x ($t'(x)=\beta_1 \cdot x \mod N$) when there is one registered server and a polynomial equation of degree n ($t'(x)=\beta_1 \cdot x+\beta_2 \cdot x^2+ \ldots +\beta_n \cdot x^n \mod N$) when there are n servers. $\beta$ is randomly selected from $(Z/qZ)^*$. For example, T' becomes $T'=t'(x)=\beta_1 \cdot x \mod N$ when there is one server. Then, the polynomial equation and hash function $P'=(p'(x), HASH)$ stored in the memory 12 within user terminal 1 is read. After receiving the polynomial equations t'(x) and p'(x), the update value generator 14 generates an updated polynomial equation P' for memory 12 and a value H' for server update. The updated polynomial equation P' can be calculated for example as $P'=t'(x)+p'(x)=(\alpha_1+\beta_1) \cdot x \mod N$ and the value H' for server update can be calculated for example as $H'=h^{t'(1)} \mod p$. In this instance, t'(1) is the resultant value from t'(x) with x being replaced by "1."

For example, if there are n registered servers, the update value generator 14 generates a value H' for the i-th server update. The value H' for server update can be calculated for example as $H'=h^{t'(i)} \mod p$. In this instance, t'(i) is the resultant value from the polynomial equation t'(x) of degree n with x being replaced by "i."

The value H' for server update needs to be sent to the server in a secure manner where the user gives it to the server administrator directly, by mail, or by telephone. The updated polynomial equation $P'=t'(x)+p'(x)$ and hash function HASH read from the memory 12 are stored in the memory 12 within the user terminal together as $P'=(t'(x)+p'(x), HASH)$.

(4) Use of Polynomial Equation and Hash Function (2)

Next, update process of the terminal 1 when initialized using polynomial equation and hash function (2) is described hereinafter with reference to FIG. 9.

First, the polynomial equation generator 13 randomly generates a polynomial equation. In this instance, the polynomial equation generator 13 generates a polynomial equation of degree one with a variable x ($t'(x)=\beta_1 \cdot x \mod N$) when there is one registered server and polynomial equation of degree n ($t'(x)=\beta_1 \cdot x+\beta_2 \cdot x^2+ \ldots +\beta_n \cdot x^n \mod N$) when there are n servers. $\beta$ is randomly selected from $(Z/qZ)^*$. For example, T' becomes $T'=t'(x)=\beta_1 \cdot x \mod N$ when there is one server. Then, the polynomial equation and hash function $P'=(p'(x), HASH)$ stored in the memory 12 within user terminal 1 is read. After receiving the polynomial equations t'(x) and p'(x), the update value generator 14 generates an updated polynomial equation P' for memory 12 and a value H' for server update. The updated polynomial equation P' can be calculated for example as $P'=t'(x)+p'(x)=(\alpha_1+\beta_1) \cdot x \mod N$ and the value H' for server update can be calculated for example as $H'=t'(1) \mod N$. In this instance, t'(1) is the resultant value from t'(x) with x being replaced by "1."

For example, if there are n registered servers, the update value generator 14 generates a value H' for the i-th server update. The value H' for server update can be calculated for example as $H'=t'(i) \mod N$. In this instance, t'(i) is the resultant value from the polynomial equation t'(x) of degree n with x being replaced by "i."

The value H' for server update needs to be sent to the server in a secure manner where the user gives it to the server administrator directly, by mail, or by telephone. The updated polynomial equation $P'=t'(x)+p'(x)$ and hash function HASH read from the memory 12 are stored in the memory 12 within the user terminal together as $P'=(t'(x)+p'(x), HASH)$.

<Server Update Process>

(1) Use of Polynomial Equation (1) and Use of Polynomial Equation and Hash Function (1)

Figure 10:
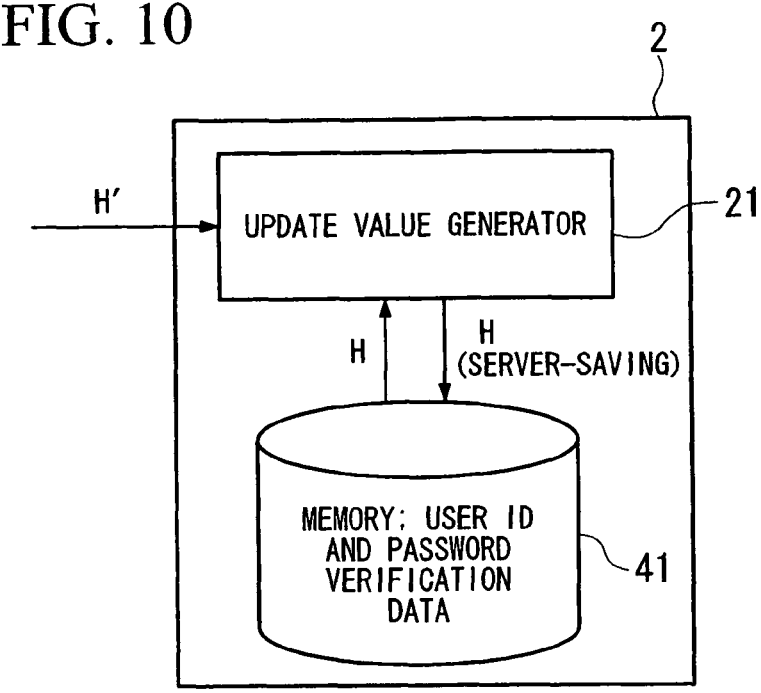
FIG. 10 is a block diagram showing the configuration of the server 2 for password verification data update—1.

First, update process of the server 2 when initialized using polynomial equation (1) and when initialized using polynomial equation and hash function (1) is described hereinafter with reference to FIG. 10. The server 2 operates as follows regardless of using a polynomial equation (1) or a polynomial equation and a hash function (1) described above.

First, the user ID and password verification data H stored in the memory 41 within the server 2 are read. After receiving a value H' for server update sent from a user terminal and the password verification data H read from the memory 41, an update value generator 21 generates an updated password verification data H for server storage. The updated password verification data H can be calculated for example as $H=h^{p(1)} \cdot h^{t'(1)}=h^{p(1)+t'(1)} \mod p$. The updated password verification data H is stored in the server memory 41.

(2) Use of Polynomial Equation (2)

Next, update process of the server 2 when initialized using polynomial equation (2) is described hereinafter with reference to FIG. 10.

First, the user ID and password verification data H stored in the memory 41 within the server 2 are read. After receiving a value H' for server update sent from a user terminal and the password verification data H read from the memory 41, the update value generator 21 generates an updated password verification data H for server storage. The updated password verification data H can be calculated for example as $H=p(1)+t'(1) \mod q$, and the updated password verification data H is stored in the memory 41 of the server 2.

(3) Use of Polynomial Equation and Hash Function (2)

Next, update process of the server 2 when initialized using polynomial equation and hash function (2) is described hereinafter with reference to FIG. 10.

First, the user ID and password verification data H stored in the memory 41 within the server 2 are read. After receiving a value H' for server update sent from a user terminal and the password verification data H read from the memory 41, the update value generator 21 generates an updated password verification data H for server storage. The updated password verification data H can be calculated for example as $H=p(1)+t'(1) \mod N$, and the updated password verification data H is stored in the memory 41 of the server 2.

<Password Verification Data Update—2>

Figure 11:
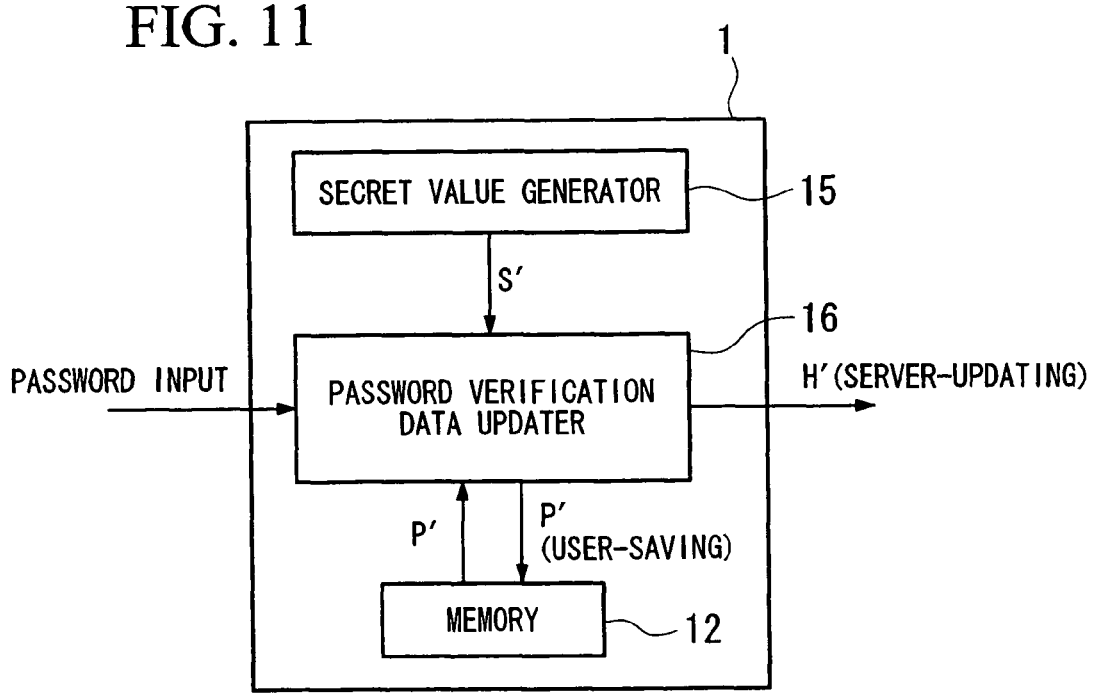
FIG. 11 is a block diagram showing the configuration of the terminal 1 for password verification data update—2.

When a user wants to update the password verification data already registered to a server together with changing the password, the user updates his own terminal. FIG. 11 is a block diagram showing the configuration of the update process of a user terminal. In the update process, after receiving a secret value S' from a secret value generator 15, a new password PW' from the user and P' stored in the memory 12 within user terminal 1, a password verification data updater 16 generates a password verification data H' for server update and an updated P' for memory 12 where H' is sent to the server 2 and the updated P'is stored in the memory 12. The update process is applicable to the use of hash function (1), hash function (2), pseudo random number generator (1) and pseudo random number generator (2) described above. In the same way, the use of polynomial equation (1), polynomial equation (2), polynomial equation and hash function (1), and polynomial equation and hash function (2) described above can be applied by following a similar operation of each initialization process. Therefore, these explanations are omitted here.

<Terminal Update Process>

(1) Use of Hash Function (1)

First, update process of the terminal 1 when initialized using hash function (1) is described with reference to FIG. 11.

First, the secret value generator 15 randomly generates a secret value S'. Then, P'=(S, HASH) stored in the memory 12 within user terminal 1 is read. After receiving a new password (PW') remembered in the brain and the hash function HASH and secret value S', the password verification data updater 16 generates an updated P' for memory 12 and a password verification data H' for server update. The password verification data H' for server update can be calculated for example as $H'=h^{HASH(S'\|PW'\|ID(U)\|ID(S))} \mod p$. In this instance, ID(U) and ID(S) represent a user ID and a server ID, respectively. The password verification data H' for server update needs to be sent to the server in a secure manner in which the user gives it to the server administrator directly, by mail, or by telephone. The updated P'=(S', HASH) is stored in the memory 12 within user terminal 1.

(2) Use of Hash Function (2)

Next, update process of the terminal 1 when initialized using hash function (2) is described hereinafter with reference to FIG. 11.

First, the secret value generator 15 randomly generates a secret value S'. Then, P'=(S, HASH) stored in the memory 12 within user terminal 1 is read. After receiving a new password (PW') remembered in the brain and hash function HASH and secret value S', the password verification data updater 16 generates an updated P' for memory 12 and a password verification data H' for server update. The password verification data H' for server update can be calculated for example as $H'=HASH(S'\|PW'\|ID(U)\|ID(S)) \mod q$. In this instance, ID(U) and ID(S) represent a user ID and a server ID, respectively. The password verification data H' for server update needs to be sent to the server in a secure manner in which the user gives it to the server 2 administrator directly, by mail, or by telephone. The updated P'=(S', HASH) is stored in the memory 12 within user terminal 1.

(3) Use of Pseudo Random Number Generator (1) and Pseudo Random Number Generator (2)

Next, update process of the terminal 1 when initialized using pseudo random number generator (1) and when initialized using pseudo random number generator (2) is described hereinafter with reference to FIG. 11.

The operation when initialized using pseudo random number generator (1 and 2) is the same as that when initialized using hash function (1 and 2), except that a pseudo random number generator PRNG is used in the place of a hash function HASH stored in the memory 12. Therefore, these explanations are omitted.

<Sever Update Process>

(1) Use of Hash Function (1), Use of Hash Function (2), Use of Pseudo Random Number Generator (1), and Use of Pseudo Random Number Generator (2)

Figure 12:
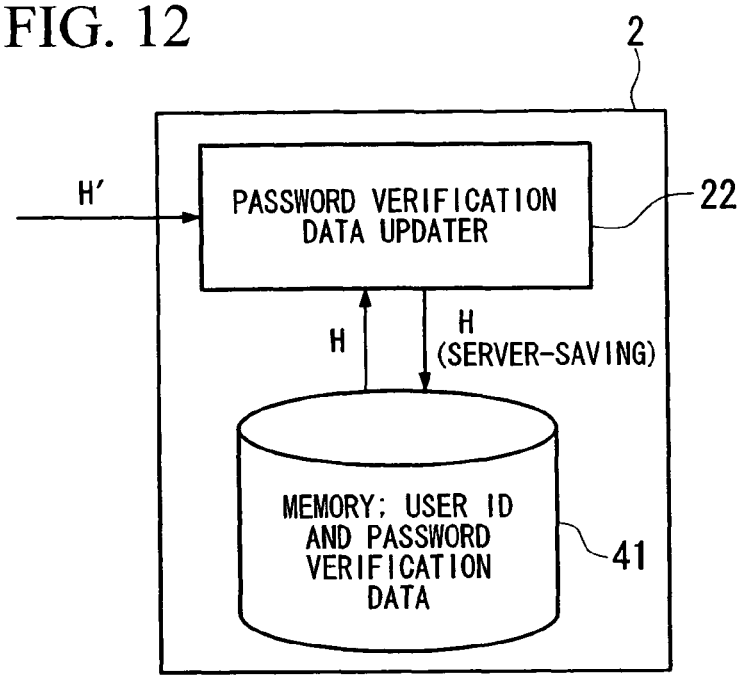
FIG. 12 is a block diagram showing the configuration of the server 2 for password verification data update—2.

First, update process of the server 2 when initialized using hash function (1), hash function (2), pseudo random number generator (1) and pseudo random number generator (2) is described with reference to FIG. 12. The server 2 operates as follows regardless of using a hash function (1 and 2) or a pseudo random number generator (1 and 2) described above.

First, the user ID and password verification data H stored in the memory 41 within the server 2 are read. After receiving a password verification data H' for server update sent from the user terminal 1 and the password verification data H read from the memory 41, the password verification data updater 22 updates the password verification data H to H' sent from the user terminal 1. The updated password verification data H=H' is stored in the memory 41 within the server.

Embodiment 2

Hereinafter, embodiments of the present invention using a public key cryptosystem are described. However, the present invention is not restricted to the following embodiments. For example, components of these embodiments can be combined in an appropriate way in order to realize another embodiment.

Here, some background knowledge and basic symbols to be used are explained before embodiments using the RSA public key cryptosystem are described.

In a public key cryptosystem, a public key (PubK) and a private key (PriK) are used in pairs (PubK, PriK). The public key is not confidential and anybody can obtain the key. In encryption, a message m can be converted into an encrypted message $C=Enc_{PubK}(m)$ using the public key. The encrypted message can be decrypted to $m=Dec_{PriK}(C)$ only using the private key. The encrypted message cannot be decrypted using the public key. In the public key signature system, a message m can be signed to create a signed message (m, s) in which $s=Sig_{PriK}(m)$. For verifying the signed message, a public key is used to obtain $m'=Ver_{PubK}(s)$ and if m and m' match, the signed message (m, s) is verified. If they do not match, the signed message (m, s) is not verified.

In the well-known RSA public key cryptosystem, a public key is (N, e) and a private key is (N, d). In this instance, N is the product of two randomly selected and large prime numbers p and q (namely, N=p q), e is any lower number provided that the greatest common denominator of e and (p−1)*(q−1) is 1 (for example, e=3 or $e=2^{16}+1$), and d is $e^{-1} \mod ((p-1)*(q-1))$. For maximum security, p and q should be in the same length. The encryption function for a message m ($m \in Z_N^*$) is $Enc_{PubK}(m)=m^e \mod N$. The decryption function is $Dec_{PriK}(C)=C^d \mod N$. It is believed to be computationally difficult to obtain a message m provided an encrypted message C and a public key (N, e). The security of RSA is based on the fact that it is difficult to factorize a large number N into prime factors.

The signature function is $\text{Sig}_{PriK}(m)=m^d \bmod N$ and the verification function is $\text{Ver}_{PubK}(s)=s^e \bmod N$. Generally, a cryptosystem has a security parameter that indicates the system's security level. Here, hash function HASH has a security parameter k (wherein it is assumed that $1/2^k$ is negligibly small) and the RSA public key cryptosystem has a security parameter l, wherein it is particularly assumed that the modulus N of RSA has a length of l. $\{0, 1\}^*$ is a set of a finite string of binary numbers and $\{0, 1\}^k$ is a set of a string of binary numbers having a length k. A hash function HASH is a secure one-way function having an input $\{0, 1\}^*$ and an output $\{, 1\}^k$. A FDH (Full-Domain Hash) function is a secure one-way function having an input $\{0, 1\}^*$ and an output $Z_N^*$/(backslash) $\{1\}$. The random number generator randomly generates a random number $T (T \in Z_N^*)$. || means that the values are concatenated.

<Terminal Initialization>

When a user wants to register to a server, the user initializes his own terminal. FIG. 1 is a block diagram showing the configuration of the initialization process of a user terminal. In the initialization process, the user enters a password and then a data extender 11 generates a password verification data H for server registration and a value P' for memory 12. The password verification data H is sent to the server and the value P' is stored in memory 12. The data extender 11 can be constituted by a polynomial equation and FDH function or FDH function.

(1) Use of Polynomial Equation and FDH Function (1)

Figure 13:
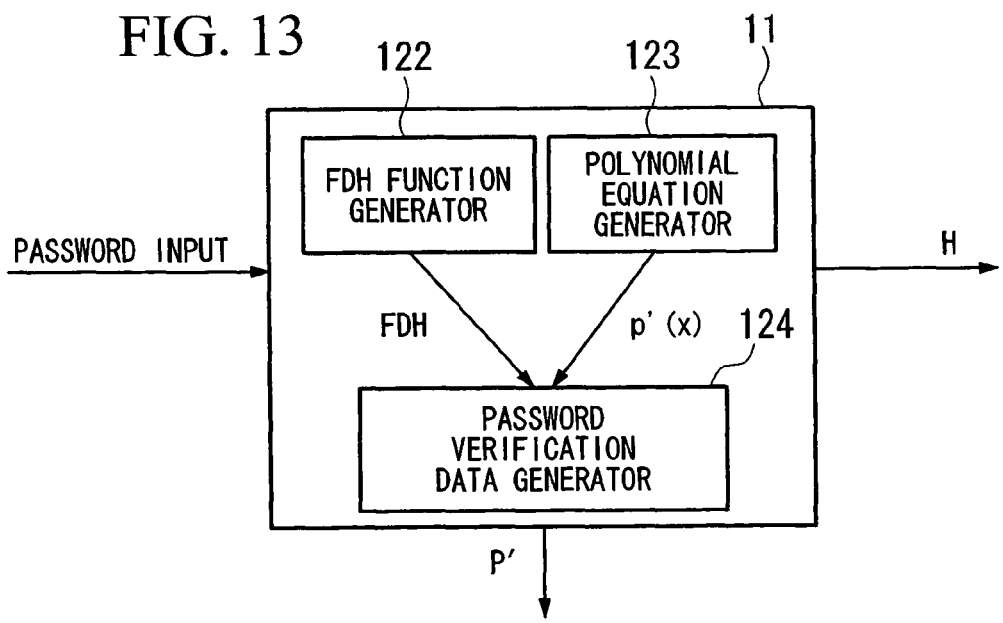
FIG. 13 is a block diagram showing the configuration of the data extender 11 in FIG. 1.

First, use of polynomial equation and FDH function (1) is described with reference to FIG. 13.

First, FDH function generator 122 randomly generates FDH function FDH. Subsequently, a polynomial equation generator 123 randomly generates a polynomial equation. In this instance, the polynomial equation generator 123 generates a polynomial equation of degree one with a variable x ($p'(x)=\alpha_1 \cdot x \bmod N$) when there is one server for registration and a polynomial equation of degree n($p'(x)=\alpha_1 x + \alpha_2 \cdot x^2 + \ldots + \alpha_n \cdot x^n \bmod N$) when there are n servers. $\alpha$ is randomly selected from $Z_N^*$. For example, $p'(x)$ becomes $p'(x)=\alpha_1 \cdot x \bmod N$ when there is one server. Then, the user enters a password (for example "Pooh93") remembered in the brain. After receiving the polynomial equation, FDH function, and the user password, a password verification data generator 124 generates a password verification data H. The password verification data H can be calculated for example as $H=p(1)=p'(1)+\text{Pooh}93 \bmod N$. In this instance, $p'(1)$ is the resultant value from $p'(x)$ with x being replaced by the server ID (for example "1"). The password verification data H needs to be sent to the server in a secure manner in which the user gives it to the server administrator directly, by mail, or by telephone. The polynomial equation $p'(x)$ generated by the polynomial equation generator and the FDH function FDH generated by the FDH function generator are stored in memory 12 within the user terminal together as $P'=(p'(x), \text{FDH})$.

(2) Use of Polynomial Equation and FDH Function (2)

Next, use of polynomial equation and FDH function (2) is described hereinafter with reference to FIG. 13.

First, the FDH function generator 122 randomly generates FDH function FDH. Subsequently, the polynomial equation generator 123 randomly generates a polynomial equation. In this instance, the polynomial equation generator 123 generates a polynomial equation of degree one with a variable $x(p'(x)=\alpha_1 \cdot x \bmod N)$ when there is one server for registration and a polynomial equation of degree n($p'(x)=\alpha_1 \cdot x + \alpha_2 \cdot x^2 + \ldots + \alpha_n \cdot x^n \bmod N$) when there are n servers. $\alpha$ is randomly selected from $Z_N^*$. For example, $p'(x)$ becomes $p'(x)=\alpha_1 \cdot x \bmod N$ when there is one server. Then, the user enters a password (for example "Pooh93") remembered in the brain. After receiving the polynomial equation, FDH function, and the user password, the password verification data generator 124 generates a password verification data H. The password verification data H can be calculated for example as $H=p(1)=p'(1)+\text{FDH}(\text{Pooh}93\|\text{ID}(U)\|\text{ID}(S)) \bmod N$. In this instance, ID(U) and ID(S) represent a user ID and a server ID, respectively. $p'(1)$ is the resultant value from $p'(x)$ with x being replaced by "1."

For example, if there are n servers for registration, the password authentication data generator 124 generates a password verification data H for the i-th server. The password verification data H can be calculated for example as $H=p(i)= p'(i)+\text{FDH}(\text{Pooh}93\|\text{ID}(U)\|\text{ID}(S)) \bmod N$. In this instance, ID(U) and ID(S) represent a user ID and an i-th server ID, respectively. $p'(i)$ is the resultant value from the polynomial equation $p'(x)$ of degree n with x being replaced by "i."

The password verification data H needs to be sent to the server in a secure manner in which the user gives it to the server administrator directly, by mail, or by telephone. The polynomial equation $p'(x)$ generated by the polynomial equation generator and the FDH function FDH generated by the FDH function generator are stored in memory 12 within user terminal together as $P'=(p'(x), \text{FDH})$.

(3) Use of FDH Function

Figure 14:
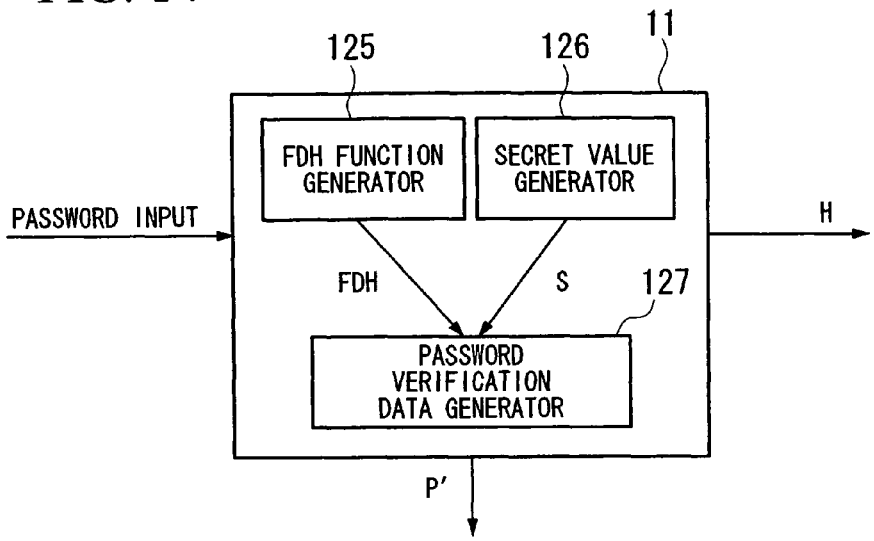
FIG. 14 is a block diagram showing the configuration of the data extender 11 in FIG. 1.

Next, use of FDH function is described hereinafter with reference to FIG. 14.

First, FDH function generator 125 randomly generates FDH function FDH. Subsequently, a secret value generator 126 randomly generates a secret value S. In this instance, S has a length that prevents brute force attacks (for example, S has 80 or more bits). Then, the user enters a password (for example "Pooh93") remembered in the brain. After receiving the FDH function, secret value S and the user password, a password verification data generator 127 generates a password verification data H. The password verification data H can be calculated for example as $H=\text{FDH}(S\|\text{Pooh}93\|\text{ID}(U)\|\text{ID}(S))$. In this instance, ID(U) and ID(S) represent a user ID and a server ID, respectively. The password verification data H needs to be sent to the server in a secure manner in which the user gives it to the server administrator directly, by mail, or by telephone. The secret value S generated by the secret value generator 126 and the FDH function FDH generated by the FDH function generator 125 are stored in memory 12 within the user terminal together as $P'=(S, \text{FDH})$.

<Initialization of the Terminal and Server>

The server executes the initialization process when it wants to send an RSA public key to a user. The server generates a pair comprising a public key and a private key according to the RSA public key cryptosystem and sends the public key to the user. In this instance, initialization can be realized through secure communication or through insecure communication. When insecure communication is used, the user has to verify whether the received public key is a legitimate one or not. The user is provided with a method of verifying that the server has generated the selected public key in an appropriate and correct way. In other words, the RSA signature system is used to verify that the largest common denominator between the public key e provided by the server and $(p-1)*(q-1)$ is 1 (namely, $\gcd(e, (p-1) \cdot (q-1))=1$).

(1) Through Secure Communication

Figure 15:
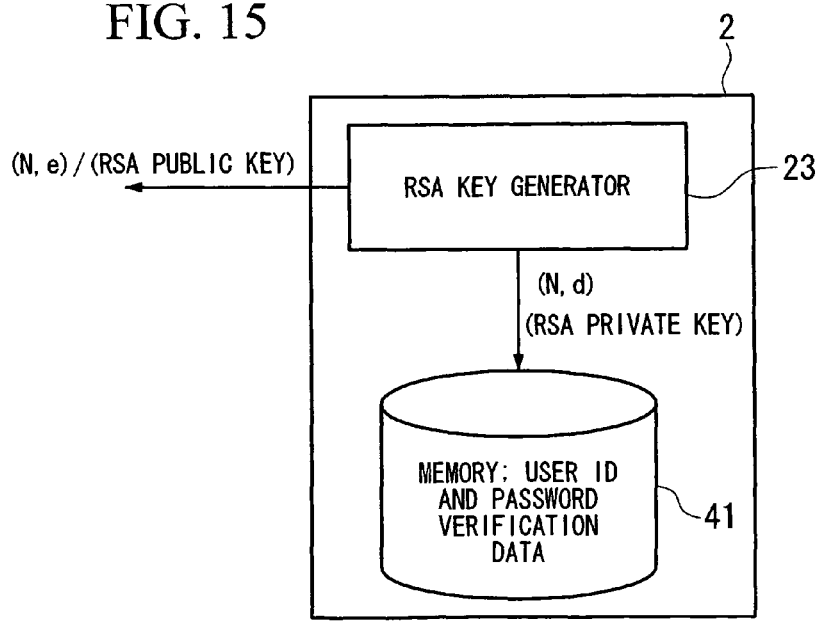
FIG. 15 is a block diagram showing the configuration of the server 2 for initialization processing through secure communications.

First, initialization process through secure communication is described with reference to FIG. 15.

First, an RSA key generator 23 generates a pair comprising a public key (N, e) and a private key (N, d). The RSA public key (N, e) needs to be sent to the user in a secure manner in which the server gives it to the user directly, by mail, or by telephone. The RSA private key (N, d) is stored in memory 41 within the server.

(2) Through Insecure Communication

Figure 16:
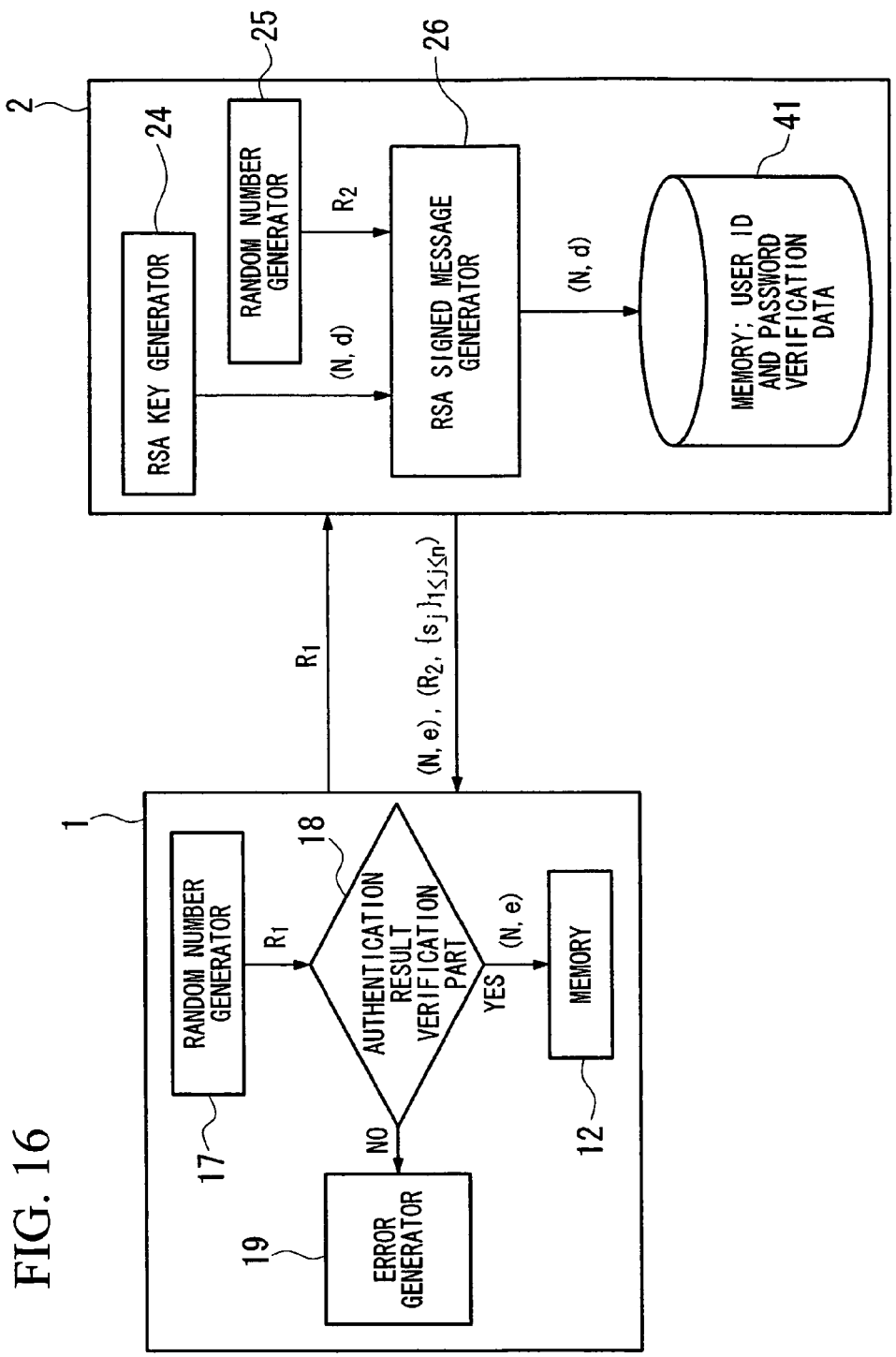
FIG. 16 is a block diagram showing the configuration of the terminal 1 and the server 2 for initialization processing through insecure communications.

Next, initialization process through insecure communication is described hereinafter with reference to FIG. 16.

First, a random number generator 17 of the user terminal 1 randomly generates a random number $R_1$ ($R_1 \in \{0, 1\}^k$) and sends it to the server. An RSA key generator 24 of the server 2 generates a pair comprising a public key (N, e) and a private key (N, d). Subsequently, a random number generator 25 randomly generates a random number $R_2$ ($R_2 \in \{0, 1\}^k$). After receiving R1 from the terminal 1, the private key (N, d) generated by the RSA key generator 24 and the random number $R_2$ generated by the random number generator 25, an RSA signed message generator 26 generates a signature $\{s_j\}_{1 \leq j \leq n}$ for $\{m_j\}_{1 \leq i \leq n}$ (In this instance, n is an integer satisfying $n \geq \log_e (PW \cdot (e-1)/e)$ in which PW is a password). The signature $\{s_j\}_{1 \leq j \leq n}$ is calculated as $\{s_j = m_j{}^d \mod N\}_{1 \leq j \leq n}$. In this instance, $\{m_j\}_{1 \leq j \leq n}$ is obtained by dividing by n a block of the output of HASH(n||N||e||ID(U)||ID(S)||$R_1$||$R_2$) having a length 1. ID(U) and ID(S) represent a user ID and a server ID, respectively. The server 2 sends the public key (N, e) and the signed message ($R_2$, $\{s_j\}_{1 \leq j \leq n}$) obtained in the calculation to the terminal 1. The private key (N, d) generated by the RSA key generator 24 is stored in memory 41 within the server 2.

After receiving $R_1$ generated by the random number generator 17 and ((N, e), ($R_2$, $\{s_j\}_{1 \leq j \leq n}$) sent from the server 2, an authentication results verification part 18 of user terminal 1 verifies the signed message (($R_2$, $\{s_j\}_{1 \leq j \leq n}$). $\{m_j\}_{1 \leq j \leq n}$ is calculated from $\{m_j = s_j{}^e \mod N\}_{1 \leq j \leq n}$ and compared with HASH(n||N||e||ID(U)||ID(S)||$R_1$||$R_2$). When $\{m_j\}_{1 \leq j \leq n}$ and HASH(n||N||e||ID(U)||ID(S)||$R_1$||$R_2$) do not match, the authentication results verification part 18 informs an error generator 19 that there is no match. As the response, the error generator 19 generates an error and terminates the process. On the other hand, if $\{m_j\}_{1 \leq j \leq n}$ and HASH(n||N||e||ID(U)||ID(S)||$R_1$||$R_2$) match, the authentication results verification part 18 verifies that the public key (N, e) of the server 2 as a legitimate one and the public key (N, e) is stored in memory 12 within the user terminal 1.

Figure 17:
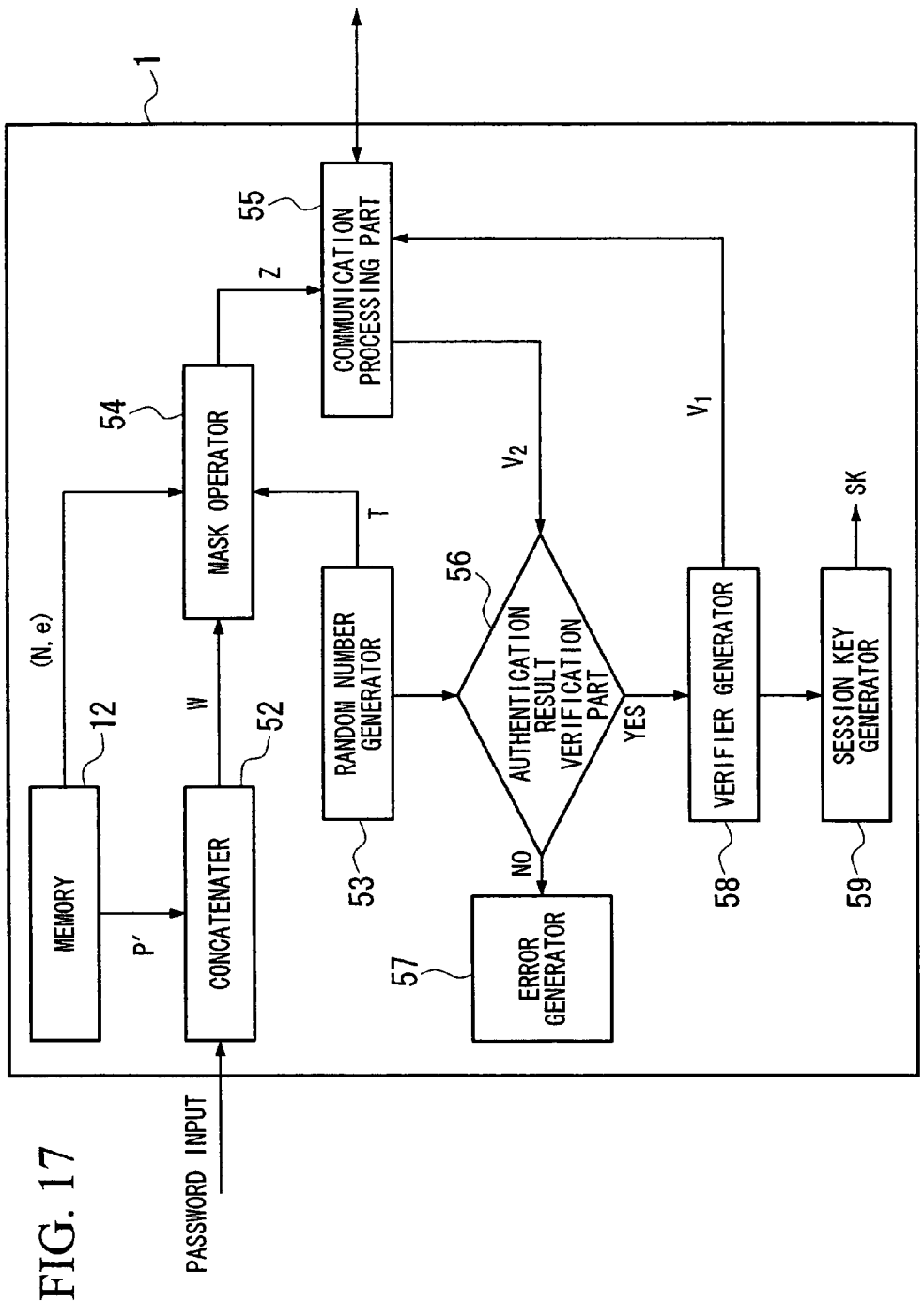
FIG. 17 is a block diagram showing the configuration of the terminal 1 in FIG. 5.
Figure 18:
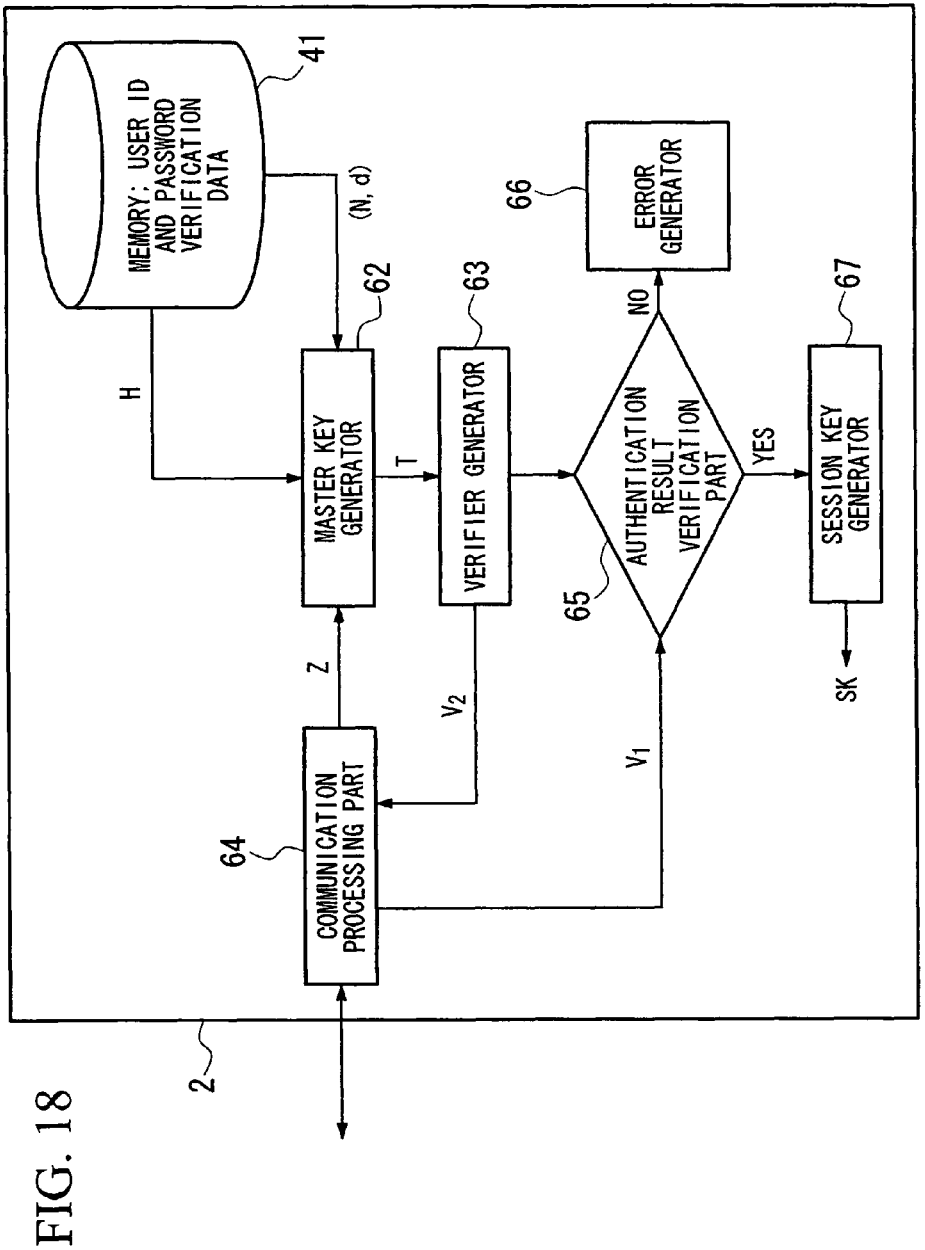
FIG. 18 is a block diagram show the configuration of the server 2 in FIG. 5.

Hereinafter, mutual authorization and key exchange operations between the terminal 1 initialized as described above and a server 2 (see FIG. 5) are described with reference to FIGS. 17 and 18.

<Terminal Operation>

(1) Use of Polynomial Equation and FDH Function (1)

First, operation of the terminal 1 when initialized using a polynomial equation and FDH function (1) is described.

First, the polynomial equation and FDH function P'=(p'(x), FDH) stored in the memory 12 within user terminal 1 is read. A concatenator 52 calculates and outputs W=FDH(p(x)||ID (U)||ID(S)) using the polynomial equation p'(x) and FDH function FDH read from the memory 12 and a password entered by the user. In this instance, p(x)=p'(x)+Pooh93 mod N. For example, if p'(x) is a polynomial equation of degree one, p(x)=p(1)=p'(1)+Pooh93=$\alpha_1 \cdot 1$+Pooh93 mod N. p'(1) is the resultant value from p'(x) with x being replaced by "1."

When the polynomial equation p'(x) read from the memory 12 within the user terminal 1 is a polynomial equation of degree n, the concatenator 52 calculates and outputs W=FDH (p(x)||ID(U)||ID(S)) using the polynomial equation p'(x) and FDH function FDH and a password entered by the user. In this instance, p(x)=p'(x)+Pooh93 mod N. For example, p(x)= p(i)=p'(i)+Pooh93 mod N. p'(i) is the resultant value from p'(x) with x being replaced by "i" for the i-th server.

A mask operator 54 calculates $Z=T^e \cdot W \mod N$ using a public key (N, e) read from the memory 12, W received from the concatenator 52 and a random number T ($T \in Z_N^*$) generated by a random number generator 53. A communication processing part 55 sends Z to the server 2 and receives $V_2$ from the server 2.

Subsequently, with the input of T from the random number generator 53 the authentication result verification part 56 calculates HASH(01||T||ID(U)||ID(S)) and compares it with $V_2$ received from the server 2. In this instance, MAC can be used in the place of the hash function HASH. When $V_2$ and HASH(01||T||ID(U)||ID(S)) do not match, the authentication results verification part 56 informs an error generator 57 that there is no match. As the response, the error generator 57 generates an error and terminates the process. On the other hand, if $V_2$ and HASH(01||T||ID(U)||ID(S)) match, the authentication results verification part 56 authenticates the server 2 as a legitimate unit and a verifier generator 58 calculates a verifier $V_1$=HASH(00||T||ID (U)||ID(S)) and sends it to the server 2. At the same time, a session key generator 59 generates a session key SK=HASH(11||T||ID(U)||ID(S)).

(2) Use of Polynomial Equation and Fdh Function (2)

Next, operation of the terminal 1 when initialized using a polynomial equation and FDH function (2) is described hereinafter.

First, a polynomial equation and FDH function P'=(p'(x), FDH) stored in memory 12 within user terminal 1 is read. The concatenator 52 calculates and outputs W=FDH(p(x)||ID (U)||ID(S)) using the polynomial equation p'(x) and FDH function FDH read from the memory 12 and a password entered by the user. In this instance, p(x)=p'(x)+FDH (Pooh93||ID(U)||ID(S)) mod N. For example, if p'(x) is a polynomial equation of degree one, p(x)=p(1)=p'(1)+FDH (Pooh93||ID(U)||ID(S))=$\alpha_1 \cdot 1$+FDH (Pooh93||ID(U)||ID(S)) mod N. p'(1) is the resultant value from p'(x) with x being replaced by "1."

When the polynomial equation p'(x) read from the memory 12 within user terminal 1 is a polynomial equation of degree n, the concatenator 52 calculates and outputs W=FDH (p(x)||ID(U)||ID(S)) using the polynomial equation p'(x) and FDH function FDH and a password entered by the user. In this instance, p(x)=p'(x)+FDH (Pooh93||ID(U)||ID (S)) mod N. For example, p(x)=p(i)=p'(i)+FDH(Pooh93||ID(U)||ID(S)) mod N. p'(i) is the resultant value from p'(x) with x being replaced by "i" for the i-th server.

The mask operator 54 calculates $Z=T^e \cdot W \mod N$ using a public key (N, e) read from the memory 12, W received from the concatenator 52, and a random number T ($T \in Z_N^*$) randomly generated by the random number generator 53. The communication processing part 55 sends Z to the server 2 and receives $V_2$ from the server 2.

Subsequently, with the input of T from the random number generator 53 the authentication result verification part 56 calculates HASH(01||T||ID(U)||ID(S)) and compares it with $V_2$ received from server 2. In this instance, an MAC can be used in the place of the hash function HASH. When $V_2$ and HASH(01||T||ID(U)||ID(S)) do not match, the authentication results verification part 56 informs the error generator 57 that there is no match. As the response, the error generator 57 generates an error and terminates the process. On the other hand, if $V_2$ and HASH(01||T||ID(U)||ID(S)) match, the authentication result verification part 56 authenticates the server 2 as a legitimate unit and the verifier generator 58 calculates a verifier $V_1$=HASH(00||T||ID(U)||ID(S)) and sends it to the server 2. At the same time, the session key generator 59 generates a session key SK=HASH(11||T||ID(U)||ID(S)).

(3) Use of FDH Function

Next, operation of the terminal 1 when initialized using a FDH function is described hereinafter.

First, a secret value and FDH function P'=(S, FDH) stored in memory 12 within user terminal 1 is read. The concatenator 52 calculates and outputs W using the secret value and FDH function FDH read from the memory 12 and a password entered by the user. For example, W=FDH(S||Pooh93||ID(U)||ID(S)). The mask operator 54 calculates $Z=T^e \cdot W$ mod N using a public key (N, e) read from the memory 12, W received from the concatenator 52 and a random number T (T∈$Z_N^*$) randomly generated by the random number generator 53. The communication processing part 55 sends Z to the server 2 and receives $V_2$ from the server 2.

Subsequently, with the input of T from the random number generator 53 the authentication results verification part 56 calculates HASH(01||T||ID(U)||ID(S)) and compares it with $V_2$ received from the server 2. In this instance, an MAC can be used in the place of the hash function HASH. When $V_2$ and HASH(01||T||ID(U)||ID(S)) do not match, the authentication result verification part 56 informs the error generator 57 that there is no match. As the response, the error generator 57 generates an error and terminates the process. On the other hand, if $V_2$ and HASH(01||T||ID(U)||ID(S)) match, the authentication result verification part 56 authenticates the server 2 as a legitimate unit and the verifier generator 58 calculates a verifier $V_1$=HASH(00||T||ID(U)||ID(S)) and sends it to the server 2. At the same time, the session key generator 59 generates a session key SK=HASH(11||T||ID(U)||ID(S)).

<Server Operation>

(1) Use of Polynomial Equation and FDH Function (1) and Use of Polynomial Equation and FDH Function (2)

The server 2 operates as follows regardless of using a polynomial equation and FDH function (1) or a polynomial equation and FDH function (2) described above.

First, the user ID and password verification data H stored in memory 41 within the server 2 are read. After receiving H read from the memory 41, a private key (N, d) and Z sent from the terminal 1, a master key generator 62 calculates and outputs T=(Z/W)d mod N. In this instance, W=FDH(H||ID(U)||ID(S)). A verifier generator 63 calculates a verifier $V_2$=HASH(01||T||ID(U)||ID(S)) using T received from the master key generator 62. A communication processing part 64 sends $V_2$ obtained in the calculation to the terminal 1 and outputs $V_1$ received from the terminal 1 to authentication result verification part 65.

Subsequently, with the input of T from the master key generator 62 the authentication results verification part 65 calculates HASH(00||T||ID(U)||ID(S)) and compares it with $V_1$ received from the terminal 1. In this instance, an MAC can be used in the place of the hash function HASH. When $V_1$ and HASH(00||T||ID(U)||ID(S)) do not match, the authentication result verification part 65 informs an error generator 66 that there is no match. As the response, the error generator 66 generates an error and terminates the process. On the other hand, if $V_1$ and HASH(00||T||ID(U)||ID(S)) match, the authentication result verification part 65 authenticates the terminal 1 as a legitimate unit and a session key generator 67 generates a session key SK=HASH(11||T||ID(U)||ID(S)).

(2) Use of FDH Function

Next, operation of the server 2 when initialized using FDH function is described hereinafter.

First, the user ID and password verification data H stored in memory 41 within the server 2 are read. After receiving H read from the memory 41, a private key (N, d) and Z sent from the terminal 1, the master key generator 62 calculates $T=(Z/W)^d$ mod N. In this instance, W=H. The verifier generator 63 calculates a verifier $V_2$=HASH(01||T||ID (U)||ID(S)) using T received from the master key generator 62. The communication processing part 64 sends $V_2$ obtained in the calculation to the terminal 1 and outputs $V_1$ received from the terminal 1 to the authentication results verification part 65.

Subsequently, with the input of T from the master key generator 62 the authentication results verification part 65 calculates HASH(00||T||ID(U)||ID(S)) and compares it with $V_1$ received from the terminal 1. In this instance, an MAC can be used in the place of the hash function HASH. If $V_1$ and HASH(00||T||ID(U)||ID(S)) do not match, the authentication result verification part 65 informs the error generator 66 that there is no match. As the response, the error generator 66 generates an error and terminates the process. On the other hand, if $V_1$ and HASH(00||T||ID(U)||ID(S)) match, the authentication result verification part 65 authenticates the terminal 1 as a legitimate unit and the session key generator 67 generates a session key SK=HASH(11||T||ID(U)||ID(S)).

<Password Verification Data Update—1>

Figure 19:
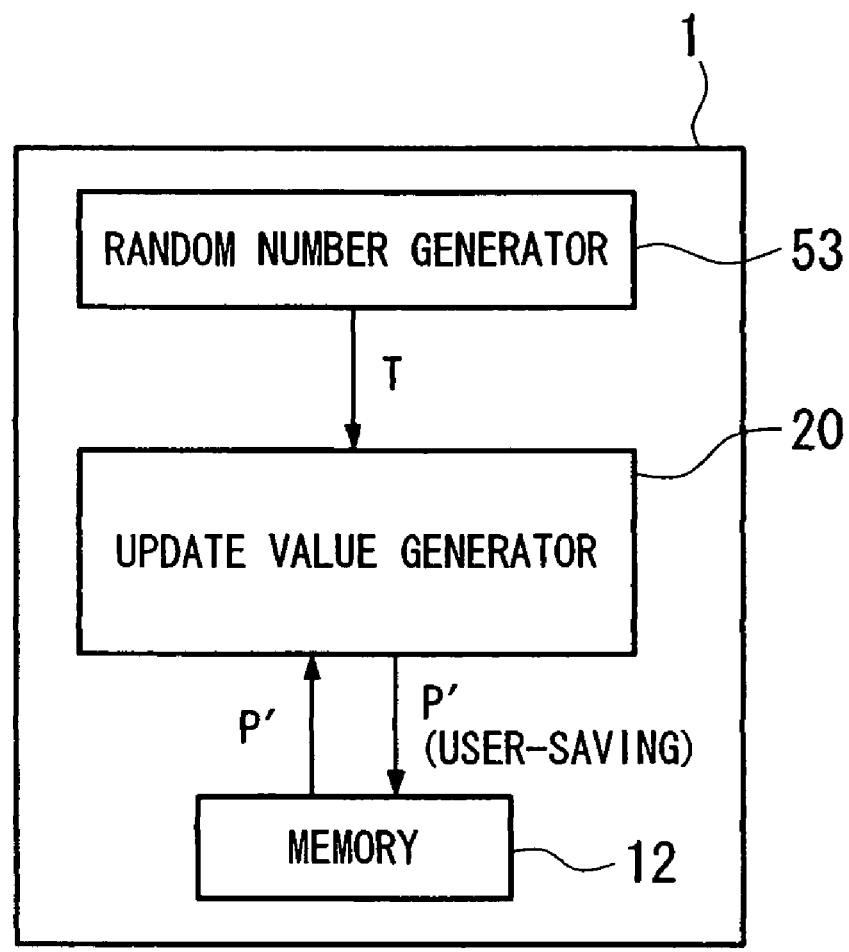
FIG. 19 is a block diagram showing the configuration of the terminal 1 for update processing using a master key.

When a user wants to update the password verification data already registered to a server, without changing the password, the user updates his own terminal. FIGS. 9 and 19 are block diagrams showing the configuration of the update process of a user terminal. The update process is applicable to the use of polynomial equation and FDH function (1), polynomial equation and FDH function (2), and master key. The update process can prevent replay attacks on the server as well.

<Terminal Update Process>

(1) Use of Polynomial Equation and FDH Function (1) and Use of Polynomial Equation and FDH Function (2)

First, update process of the terminal 1 when initialized using polynomial equation and FDH function (1) and when initialized using polynomial equation and FDH function (2) is described with reference to FIG. 9. The terminal 1 operates as follows regardless of using a polynomial equation and FDH function (1) or a polynomial equation and FDH function (2) described above.

First, the polynomial equation generator 13 randomly generates a polynomial equation. In this instance, the polynomial equation generator 13 generates a polynomial equation of degree one with a variable x(t'(x)=$\beta_1 \cdot x$ mod N) when there is one registered server and a polynomial equation of degree n(t'(x)=$\beta_1 \cdot x + \beta_2 \cdot x^2 + \ldots + \beta_n \cdot x_n$ mod N) when there are n servers. β is randomly selected from $Z_N^*$. For example, T becomes T'=t'(x)=$\beta_1 \cdot x$ mod N when there is one server. Then, a polynomial equation and FDH function P'=(p'(x), FDH) stored in memory 12 within user terminal 1 are read. After receiving the polynomial equations t'(x) and p'(x), an update value generator 14 generates an updated polynomial equation P' for memory 12 and a value H' for server update. The updated polynomial equation P' can be calculated for example as P'=t'(x)+p'(x)=($\alpha_1 + \beta_1) \cdot x$ mod N. The value H' for server update can be calculated for example as H'=t'(1) mod N. t'(1) is the resultant value from t'(x) with x being replaced by "1."

For example, if there are n registered servers, the update value generator 14 generates a value H' for the i-th server update. The value H' for server update can be calculated for example as H'=t'(i) mod N. t'(i) is the resultant value from the polynomial equation t'(x) of degree n with x being replaced by "i."

The value H' for server update needs to be sent to the server in a secure manner in which the user gives it to the server administrator directly, by mail, or by telephone. The updated polynomial equation P'=t'(x)+p'(x) and the FDH function FDH read from the memory 12 are stored in the memory 12 within the user terminal together as P'=(t'(x)+P'(x), FDH).

(2) Use of Master Key

Next, update process of the terminal 1 when using a master key is described hereinafter with reference to FIG. 19.

First, a random number generator 53 randomly generates a random number $T(T \in Z_N^*)$. Then, a polynomial equation and FDH function P'=(p'(x), FDH) stored in memory 12 within the user terminal 1 are read. After receiving the random number T and polynomial equations p'(x), an update value generator 20 generates an updated polynomial equation P' for memory 12. The updated polynomial equation P' can be calculated for example as P'=T+p'(x) mod N. The updated polynomial equation P'=T+p'(x) and the FDH function FDH read from the memory 12 are stored in memory 12 within the user terminal together as P'=(T+p'(x), FDH).

<Sever Update Process>

(1) Use of Polynomial Equation and FDH Function (1) and Use of Polynomial Equation and FDH Function (2)

First, update process of the server 2 when initialized using polynomial equation and FDH function (1) and when initialized using polynomial equation and FDH function (2) is described with reference to FIG. 10. The server 2 operates as follows regardless of using a polynomial equation and FDH function (1) or a polynomial equation and FDH function (2) described above.

First, the user ID and password verification data H stored in memory 41 within the server 2 are read. After receiving a value H' for server update sent from a user terminal and the password verification data H read from memory 41, an update value generator 21 generates an updated password verification data H for server storage. The updated password verification data H can be calculated for example as H=p(1)+t'(1) mod N. The updated password verification data H is stored in memory 41 within the server.

(2) Use of Master Key

Figure 20:
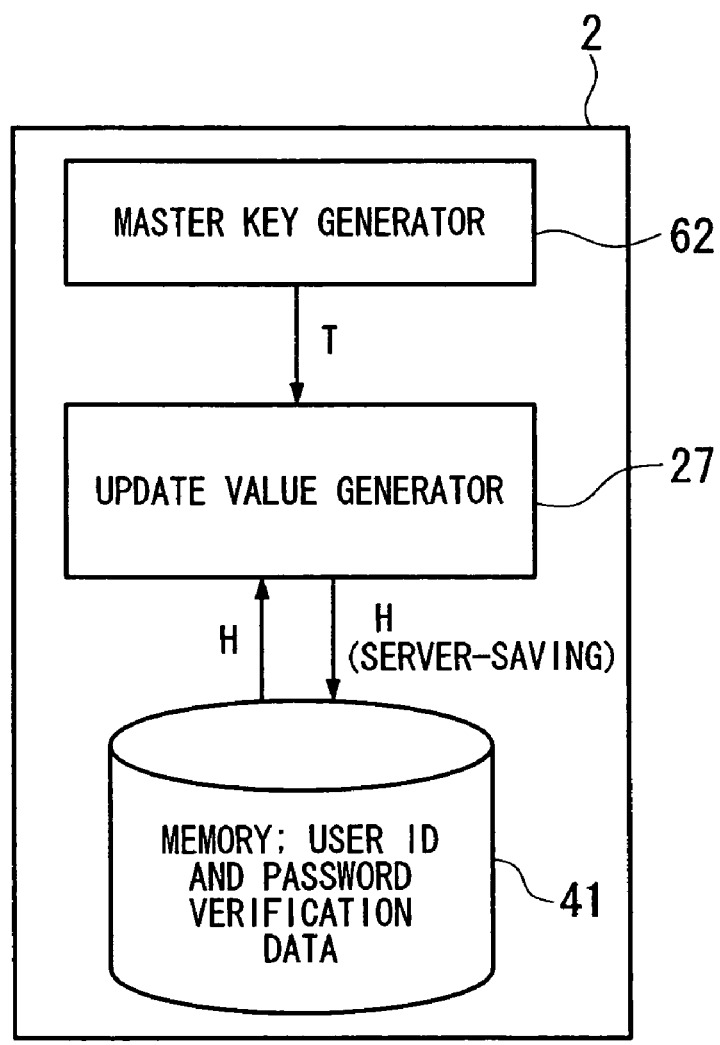
FIG. 20 is a block diagram showing the configuration of the server 2 for update processing using a master key.

Next, update process of the server 2 when using a master key is described hereinafter with reference to FIG. 20.

First, a master key generator 62 generates a master key T. Then, the user ID and password verification data H stored in memory 41 within the server 2 are read. After receiving the master key T and the password verification data H read from the memory 41, an update value generator 27 generates an updated password verification data H for server storage. The updated password verification data H can be calculated for example as H=p(1)+T mod N. The updated password verification data H is stored in memory 41 within the server.

<Password Verification Data Update—2>

When a user wants to update the password verification data already registered to a server together with changing the password, the user updates his own terminal. FIG. 11 is a block diagram showing the configuration of the update process of a user terminal. In the update process, after receiving a secret value S' from a secret value generator 15, a new password PW' to be remembered by the user, and P' stored in the memory within the user terminal 1, a password verification data updater 16 generates a password verification data H' for server update and an updated P' for memory 12. H' is sent to the server and the updated P' is stored in memory 12. In this instance, the update process is applicable to the use of FDH function described above. The update process can prevent replay attacks on the server as well. In the same way, the use of polynomial equation and FDH function (1) and polynomial equation and FDH function (2) described above can be applied by following a similar operation of each initialization process. Therefore, these explanations are omitted here.

<Terminal Update Process>

(1) Use of FDH Function

First, update process of the terminal 1 when initialized using FDH function is described hereinafter with reference to FIG. 11.

First, the secret value generator 15 randomly generates a secret value S'. Then, P'=(S, FDH) stored in the memory 12 within the user terminal 1 is read. After receiving a new password (PW') to be remembered by the user and the FDH function FDH and secret value S', a password verification data updater 16 generates an updated P' for memory 12 and a password verification data H' for server update. The password verification data H' for server update can be calculated for example as H'=FDH (S'||PW'||ID(U)||ID(S)). In this instance, ID(U) and ID(S) represent a user ID and a server ID, respectively. The password verification data H' for server update needs to be sent to the server in a secure manner in which the user gives it to the server administrator directly, by mail or by telephone. The updated P'=(S', FDH) is stored in the memory 12 within the user terminal 1.

<Sever Update Process>

(1) Use of FDH Function

Next, update process of the server 2 when initialized using the FDH function is described hereinafter with reference to FIG. 12.

First, the user ID and password verification data H stored in the memory 41 within the server 2 are read. After receiving a password verification data H' for server update sent from user terminal 1 and the password verification data H read from the memory 41, a password verification data updater 22 updates the password verification data H to H' sent from the user terminal 1. The updated password verification data H=H' is stored in the memory 41 within the server.

As described above, when initialized using a polynomial equation a user password is information-theoretically secure in the sense that someone who is attempting unauthorized use of the user's terminal cannot get any information about the password. Even if someone (e.g., an attacker or a server administrator) steals information stored in the server by hacking or using virus, the user's password is information-theoretically secure. When initialized using a hash function, a pseudo random number generator or a FHD function, a user password is computationally secure against someone attempting unauthorized use of the user's terminal.

Next are descriptions of a remotely-distributed storage system that is one application of the authentication system described above.

<Data Storing Process of a Remotely-Distributed Storage System when Distributed Data is not Stored on Terminal>

Figure 21:
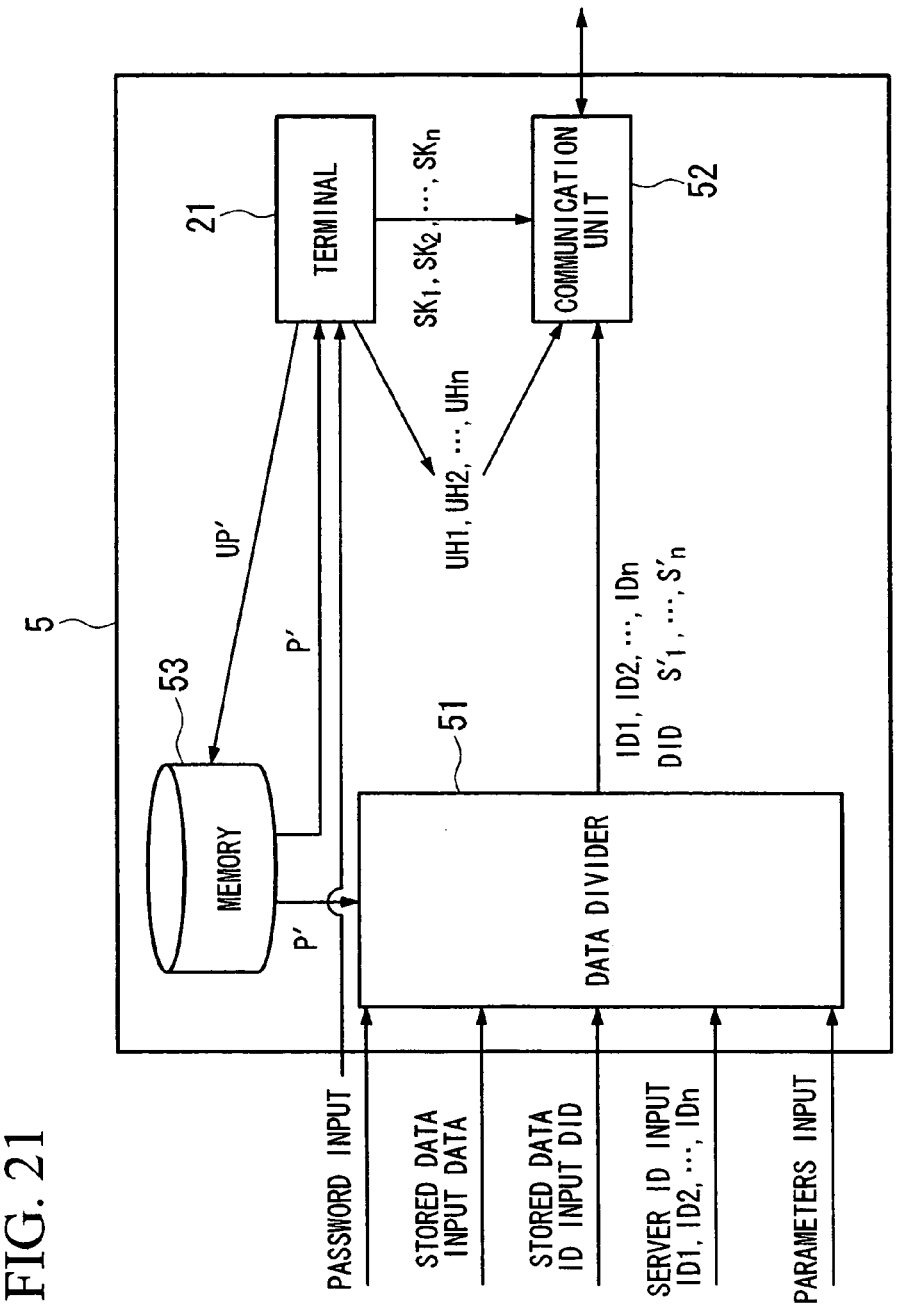
FIG. 21 is a block diagram showing the configuration of a remotely-distributed storage unit 5 when distributed data is not stored in the terminal.

First, data storing process of a remotely-distributed storage system when distributed data is not stored in the terminal is described hereinafter with reference to FIG. 21. FIG. 21 is a block diagram showing the configuration of a remotely-distributed storage system 5 when distributed data is not stored on the terminal.

The user processes data DATA, to be distributed and stored, on his own terminal 21 and divides it into data S'1, ..., S'n for n servers. The divided data S'i is sent and stored on a server IDi together with a data ID DID by means of a communication unit 52 that can use a secure communication path created by the user terminal 21 using a session key SKi shared with the authentication server. Similarly, list information of the stored data can be divided and stored in the servers. Meanwhile, the user terminal (password verification update mode) is operated at specific intervals (intervals smaller than the interval in which the password can be obtained through off-line dictionary attacks, for example, every time the authentication is conducted, or once in two or three days) to generate information UP', UH1, ..., UHn for updating P' and H stored on each server and update them.

In this way, both the data stored on the servers and the authentication data can be robust against leakage and damage. Resistance to leakage and damage can be expressed by four sets of parameters (n, DS, LS1, LS2). DS, LS1 and LS2 are sets of combinations of entities (subject to leakage and damage) where DS represents resistance to data damage and LS1 and LS2 represent resistance to data leakage. DS describes a combination of entities that can be damaged, and in any combination of damage the user can restore his own data even if the stored data including local backups is completely unusable, for example, because of a disaster. LS1 describes a combination of entities in which the recorded information can be leaked. That is, in any combination of leakage, it is difficult for the attacker to restore the stored data. LS2 describes a combination of entities for which some countermeasure is taken when the recorded information is leaked. That is, in any combination of leakage the countermeasure makes it difficult for the attacker to restore the stored data.

Usually, we assume that the user's password is small enough for an attacker to do exhaustive search off-line. When a previous authentication system vulnerable to leakage is used, the attacker can totally search out the user's password using leaked information and information on communication paths. Consequently, the attacker can pretend to be the user and obtain all of the data remotely distributed and stored. In other words, LS1 could not include server {S} and user's possession {U}, respectively. Conversely, by using an authentication system robust to leakage LS1 can include server {S} and user's possession {U}. All of the remote authentication systems including ones robust to leakage allow for an attacker to search for the user's password when information is leaked from both the user possession {U} and the server {S}. As a result, it is possible for the attacker to pretend to be the user and obtain all of the remotely-distributed and stored data. Therefore, LS2 could not include a combination {US} of user possession {U} and server {S}. However, by updating P' and H1, ..., Hn LS2 can include combinations of user possession and server.

Figure 22:
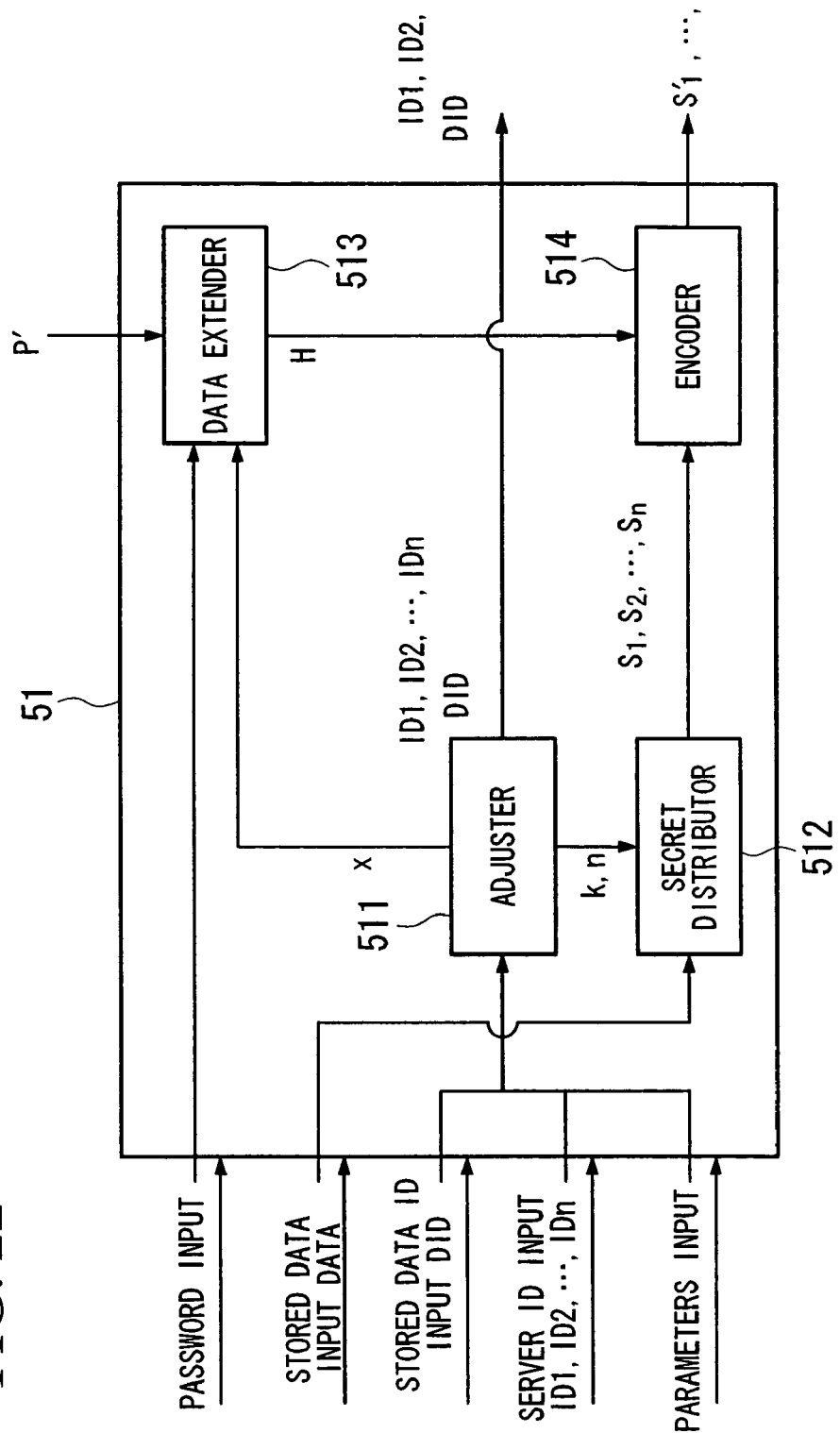
FIG. 22 is a block diagram showing the configuration of the data divider 51 in FIG. 21.

Next, configuration of the data divider 51 shown in FIG. 21 is described hereinafter with reference to FIG. 22. An adjustor 511 supplies input parameters n and k to a secret distributor 512. The secret distributor 512 converts stored data DATA to (k, n) distributed data S1, S2, ..., Sn in accordance with the input parameters n and k. Then, the adjustor 511 generates an input x for a data extender 513 based on the data ID DID and supplied it to the data extender 53. The data extender 513 outputs and supplies a corresponding information H to an encoder 514. In this instance, H has a length enough to be robust against off-line exhaustive search. If the data extender 513 outputs a short H, multiple different inputs x are provided to the data extender and the resultant multiple outputs H are used. The encoder 514 encodes n−k+1 or more distributed data using H as a key. Each S1, ..., Sn−k+1 can be appended with an error detecting code. The output S'1, ..., S'n of the encoder 514 constitutes the output of the data divider 51 together with DID, ID1, ID2, ..., IDn.

In this instance, (k, n) distributed data are obtained by dividing the original data into n sets: the original data can be restored using any k data, however, the original data cannot be restored using less than k data. Instead of (k, n) distributed data, any access structure can be used for distributed data. Furthermore, the secret distributor can be realized by not only utilizing a polynomial equation or a matrix for information-theoretic security, but also using encryption process to reduce the size of distributed data for computational security.

The data divider 51 realizes (n, DS, LS1, LS2)=(n, {CSn−k}, {UC, CSn}, {UCSk−1}). {CS} comprises all and part of the stored information of client and servers. {Sn} comprises all and part of the stored information of n servers. {C, S} comprises "all and part of the stored information of clients and all and part of the stored information of servers", respectively. Leakage from {UCSk−1} can be handled using the authentication information update process. If the authentication information is updated while an attacker is trying to obtain the user's password from {UCSk−1}, the attacker cannot obtain the data. A solution to the loss of user possession {U} (loss of P') is to locally copy the data recorded as {U} whenever each update is run. A solution to the danger, caused by damaged local copies and {U} as a result of a disaster, is to divide the data recorded in {U} by a secret distributor into (k', n) distributed data and to save each on the corresponding server. When k'>=k, (n, DS, LS1, LS2)=(n, {UCSn−k', CSn−k}, {UC, CSk'−1}, {UCSk−1}) is realized. When k'<k, (n, DS, LS1, LS2)=(n, {UCSn−k, CSn−k}, {UC, CSk'−1}, {UCSk−1, CSk−1}) is realized.

Moreover, if all or some of the data recorded in the user possession and password is/are divided by a secret distributor into (k', n) distributed data and stored in each server, the (recorded information in the possession and) password can be restored through off-line dictionary attacks even if the user forgets the password. In this case, 1) off-line analysis can be skipped when all the data is distributed; and 2) the computation cost required for off-line analysis can be reduced depending on the amount when some of the data is distributed. With this functionality, the user can control the level of restoring the data (which is the same level of restoring the data as the case when an attacker obtains {CSk'}) when the user grants to a third party the right to decrypt the data.

<Data Decoding Process of a Remotely-Distributed Storage System when Data is not Stored on the Terminal>

Figure 23:
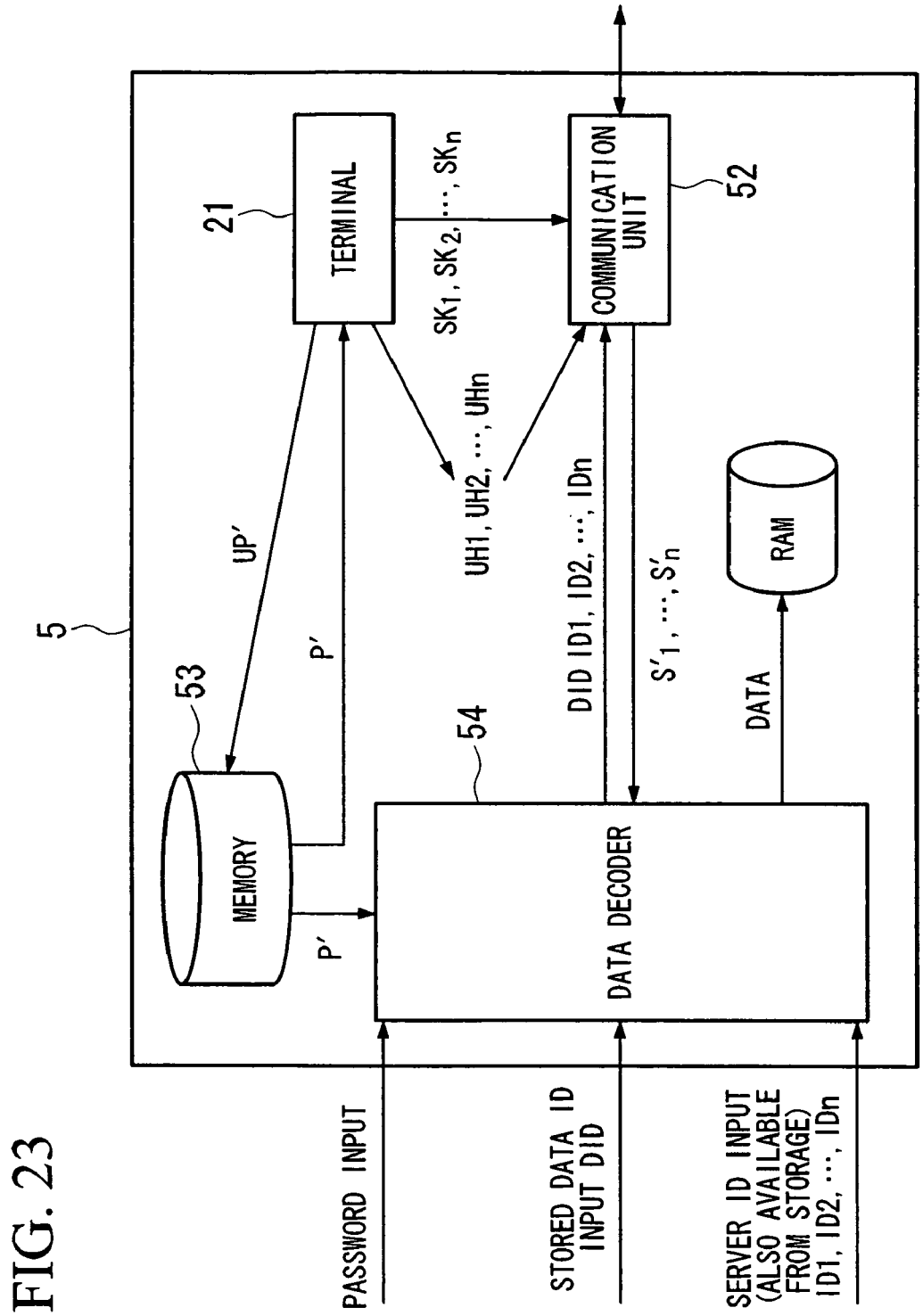
FIG. 23 is a block diagram showing the configuration of a remotely-distributed storage unit 5 when data is not stored in the terminal.

Next, data decoding process of a remotely-distributed storage system when data is not stored on the terminal is described hereinafter with reference to FIG. 23. FIG. 23 is a block diagram showing the configuration of a remotely-distributed storage system 5 when data is not stored on the terminal.

A data decoder 54 receives at least k distributed data sets corresponding to an input DID among distributed data sets S'1, ..., S'n from servers ID1, ID2, ..., IDn via a communication unit 52. The data decoder 54 decodes at least k sets of distributed data among S'1, ..., S'n to restore DATA. In the same way, a list of stored data can be restored. A user terminal 21 (in authentication data update mode) is operated at appropriate intervals (at intervals smaller than the interval of when the password can be found with off-line dictionary attacks, for example, everytime the authorization is conducted or once in two or three days) to generate information UP', UH1, ..., UHn for updating P' and H stored on each server and update them.

Figure 24:
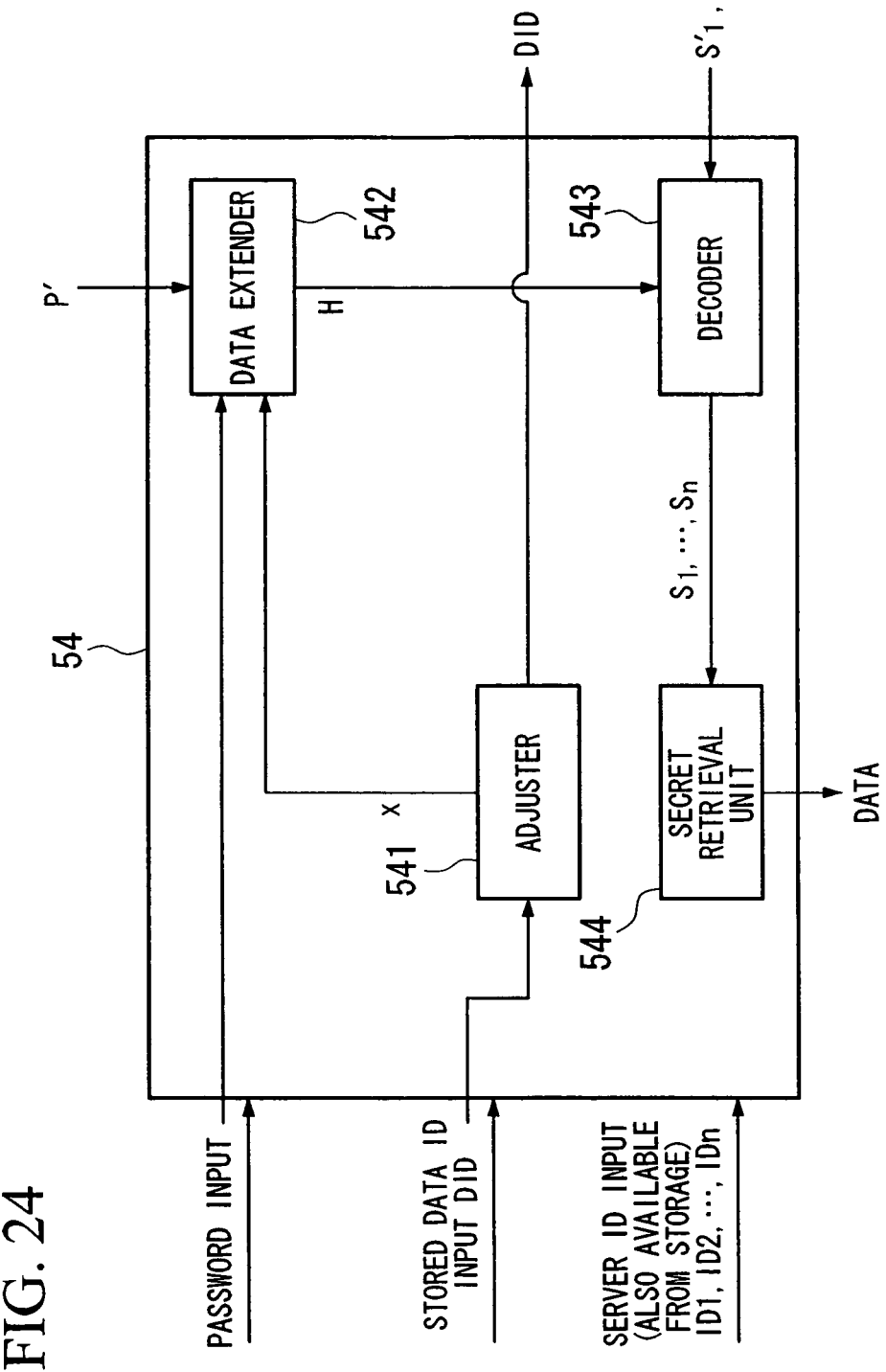
FIG. 24 is a block diagram showing the configuration of the data decoder 54 in FIG. 23.

Next, configuration of the data decoder 54 shown in FIG. 23 is described hereinafter with reference to FIG. 24. An adjustor 541 outputs n input server IDs, ID1, ID2, ..., IDn and DID. The adjustor 541 also generates an input x for a data extender 542 based on DID and supplies it to the data extender 542. The data extender 542 outputs the corresponding information H and supplies it to a decoder 543. The decoder 543 decodes encoded distributed data among the sets S'1, S'2, ..., S'n and supplies S1, S2, ..., Sn to a secret retrieval unit. The secret retrieval unit 544 restores DATA from the supplied distributed data. In this instance, un-altered k distributed data sets can be supplied after error detection is conducted.

<Data Storing Process of a Remotely-Distributed Storage System when Distributed Data is Stored on the Terminal>

Figure 25:
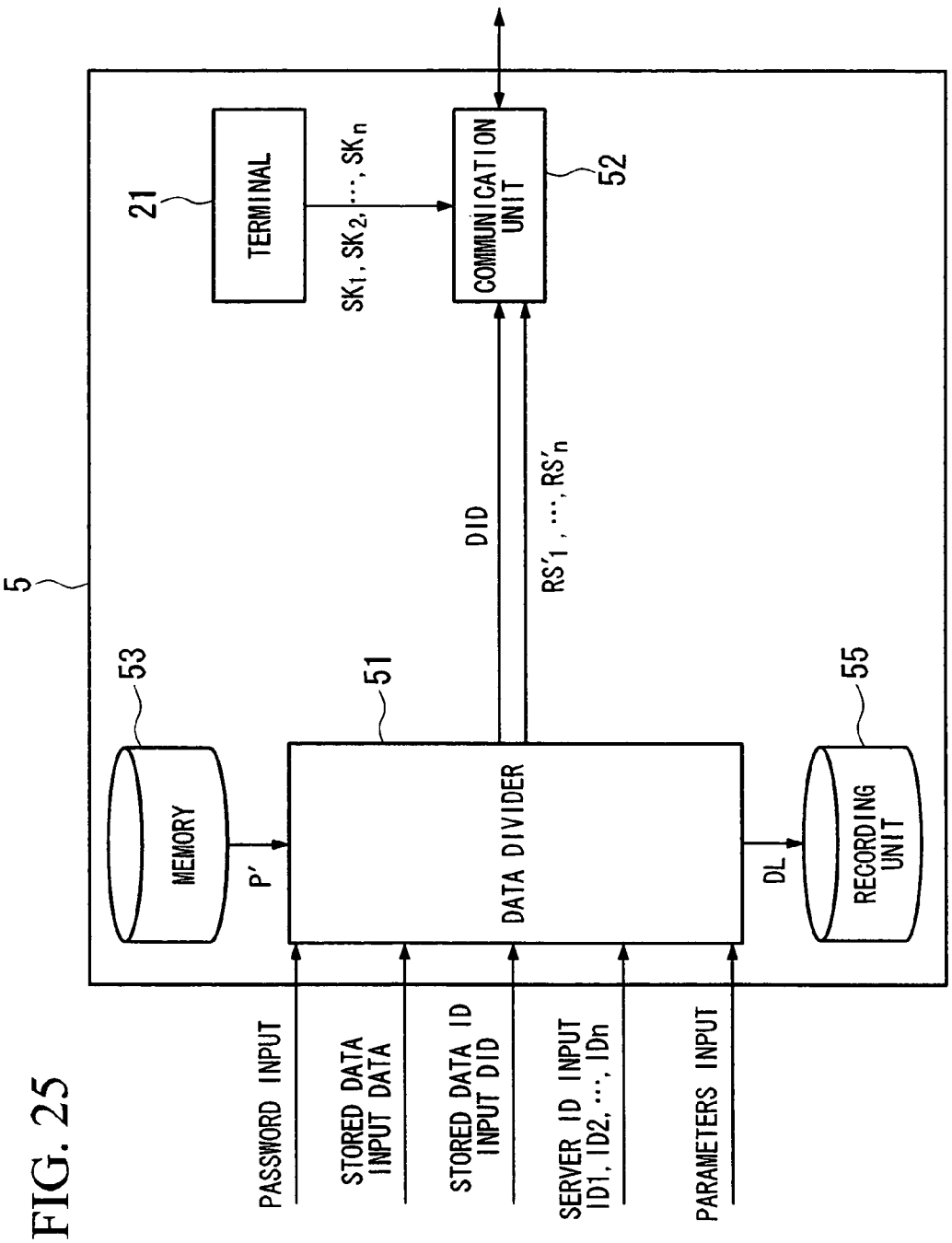
FIG. 25 is a block diagram showing the configuration of a remotely-distributed storage unit 5 when distributed data is also stored in the terminal.

Next, data storing process of a remotely-distributed storage system when distributed data is stored on the terminal is described hereinafter with reference to FIG. 25. FIG. 25 is a block diagram showing the configuration of a remotely-distributed storage system 5 when distributed data is stored on the terminal. Here, only the different part from the configuration shown in FIG. 21 is described.

The user processes data DATA that he/she wants to distribute with his own computer 21 and separates data DL to be stored from data RS'1, ..., RS'n to be stored in n servers. DL is stored on a recording unit 55 at the user side and divided data RS'1 is sent to a server IDi together with a data ID DIA through a secure communication path created by user terminal 21 using a key SKi shared with an authentication server. In the same way, a list information of stored data can be divided and stored on the servers.

In this way, the communication cost with the server is reduced by strong part of the distributed data on the user's terminal 21. The system can be configured with variable or fixed communication cost depending on combinations of servers that may be damaged. In particular, the system with variable communication cost can reduce storage space throughout n servers. Moreover, resistance to leakage and damage can be maintained at the same level as when the data is not stored at the user side.

Figure 26:
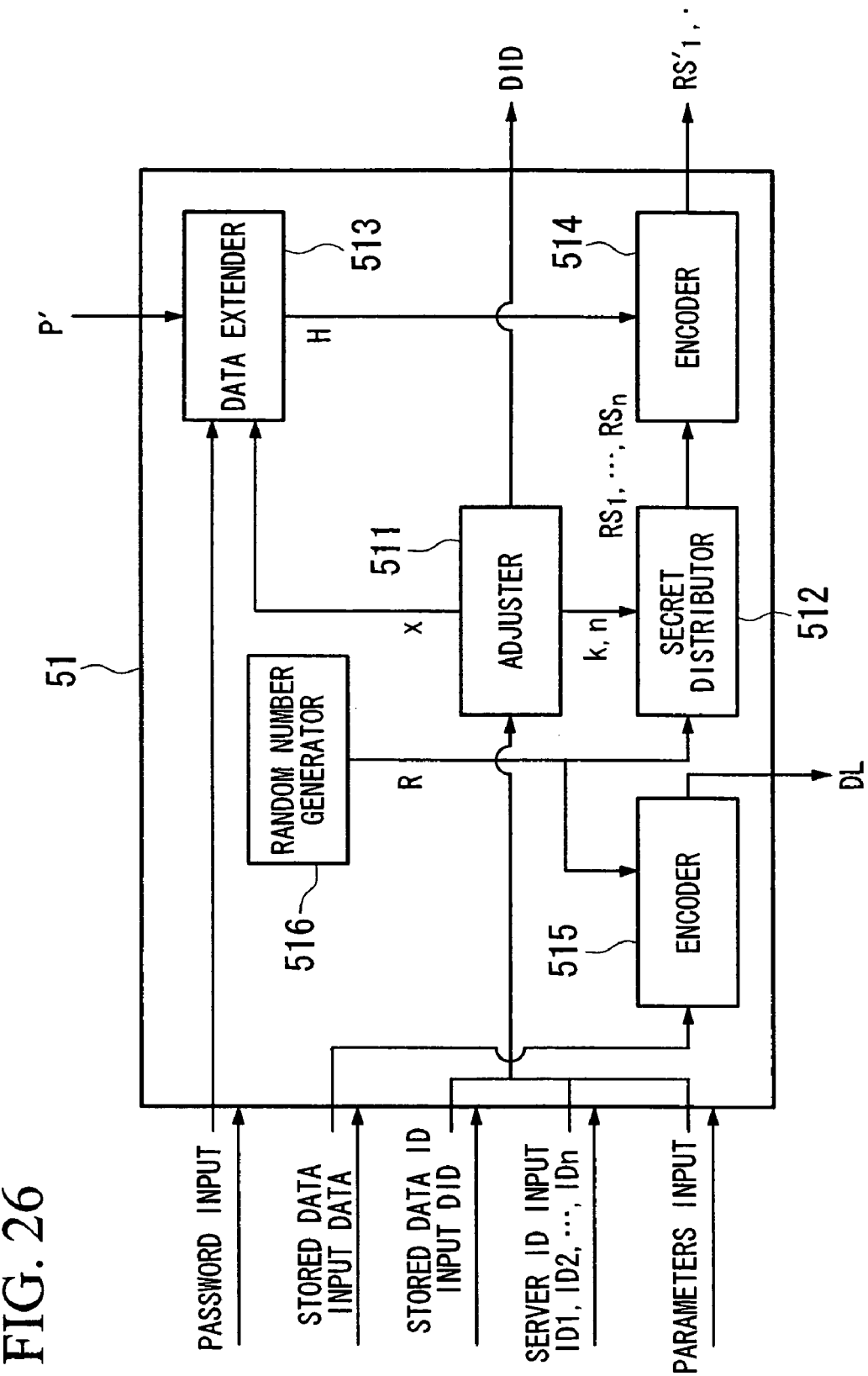
FIG. 26 is a block diagram showing the configuration of the data divider 51 in FIG. 25.

Next, configuration of the data divider 51 shown in FIG. 25 is described hereinafter with reference to FIG. 26. Here, only the different part from the configuration shown in FIG. 22 is described. An encoder 515 receives a random number R from a random number generator 516 and, using it as a key encodes and outputs the data to be stored as DL. An adjuster 511 supplies input parameters n and k to a secret distributor 512. The secret distributor 512 converts R to (k, n) distributed data RS1, RS2, ..., RSn in accordance with the input parameters n and k. Then, the adjuster 511 generates an input x for a data extender 513 from a data ID DID and supplies it to the data extender 513. The data extender 513 outputs and supplies a corresponding information H as a key to an encoder 514 where H has a length enough to be robust to off-line exhaustive search. When the data extender 513 outputs a short H, multiple different inputs x are supplied to the data extender 513 and the resultant multiple outcomes H are used. The encoder 514 encodes n−k+1 or more distributed data using H as a key. Each RS1, ..., Rn−k+1 can be appended with an error detection code. The output of the encoder is RS'1, ..., RS'n.

Instead of (k, n) distributed data, any access structure can be used for the distributed data. Furthermore, the secret distributor 512 can be realized by not only utilizing a polynomial equation or a matrix for information-theoretic security, but also using encryption process for computational security. If the size of R is small, it had better to realize the secret distributor 512 with information-theoretic security since the distributor with computational security has little effect on reducing the size.

<Data Decoding Process of a Remotely-Distributed Storage System when Distributed Data is Stored on the Terminal>

Figure 27:
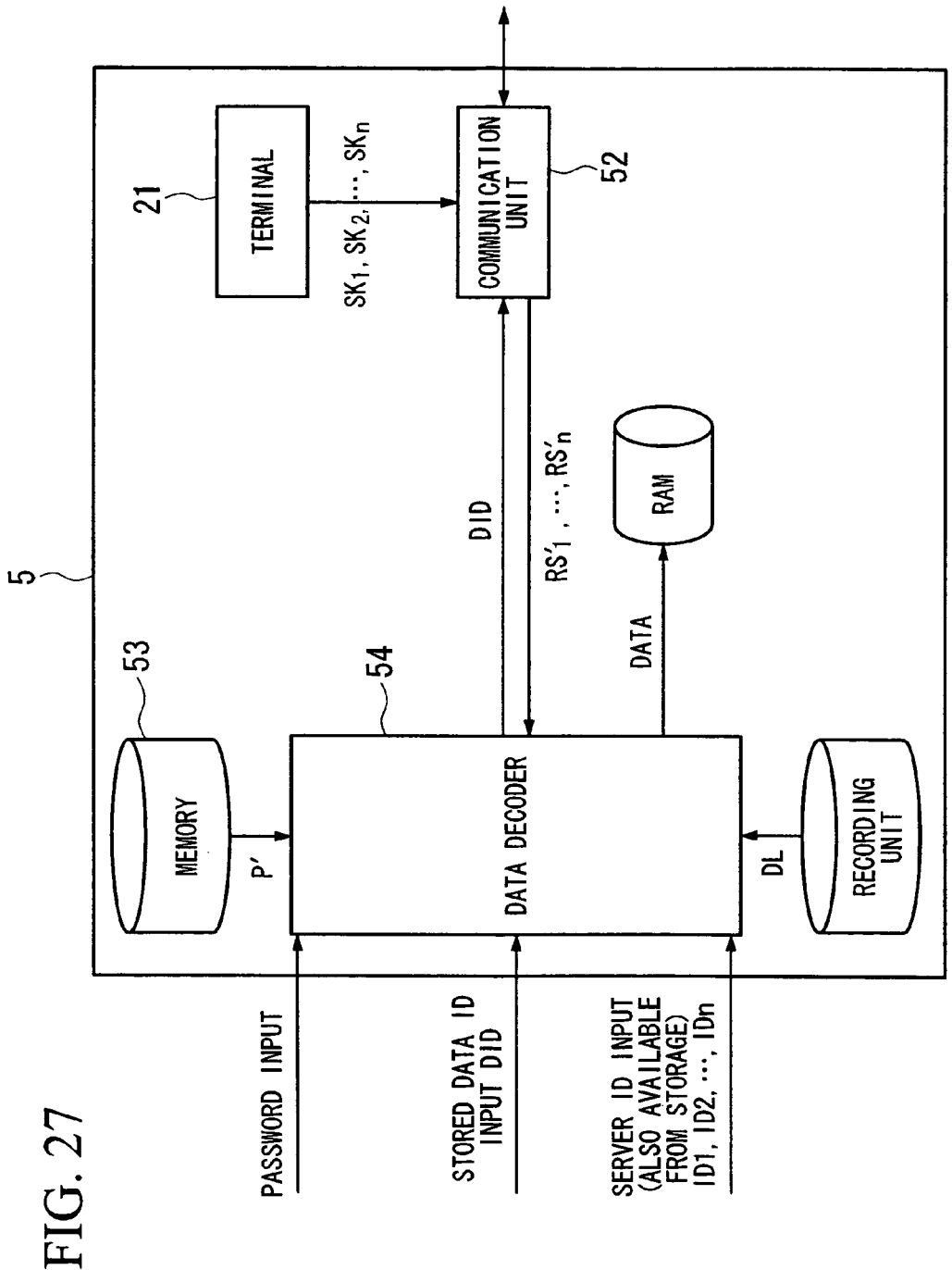
FIG. 27 is a block diagram showing the configuration of a remotely-distributed storage unit 5 when data is also stored in the terminal.

Next, data decoding process of a remotely-distributed storage system when distributed data is stored on the terminal is described hereinafter with reference to FIG. 27. FIG. 27 is a block diagram showing the configuration of a remotely-distributed storage system 5 when distributed data is stored on the terminal. Here, only the different part from the configuration shown in FIG. 23 is described.

A data decoder 54 receives at least k distributed data sets corresponding to an input DID among RS'1, ..., RS'n from servers ID1, ID2, ..., IDn via a communication unit. The data decoder 54 processes at least k distributed data sets among RS'1, ..., RS'n and restores DATA. In the same way, a list of stored data can be restored.

Figure 28:
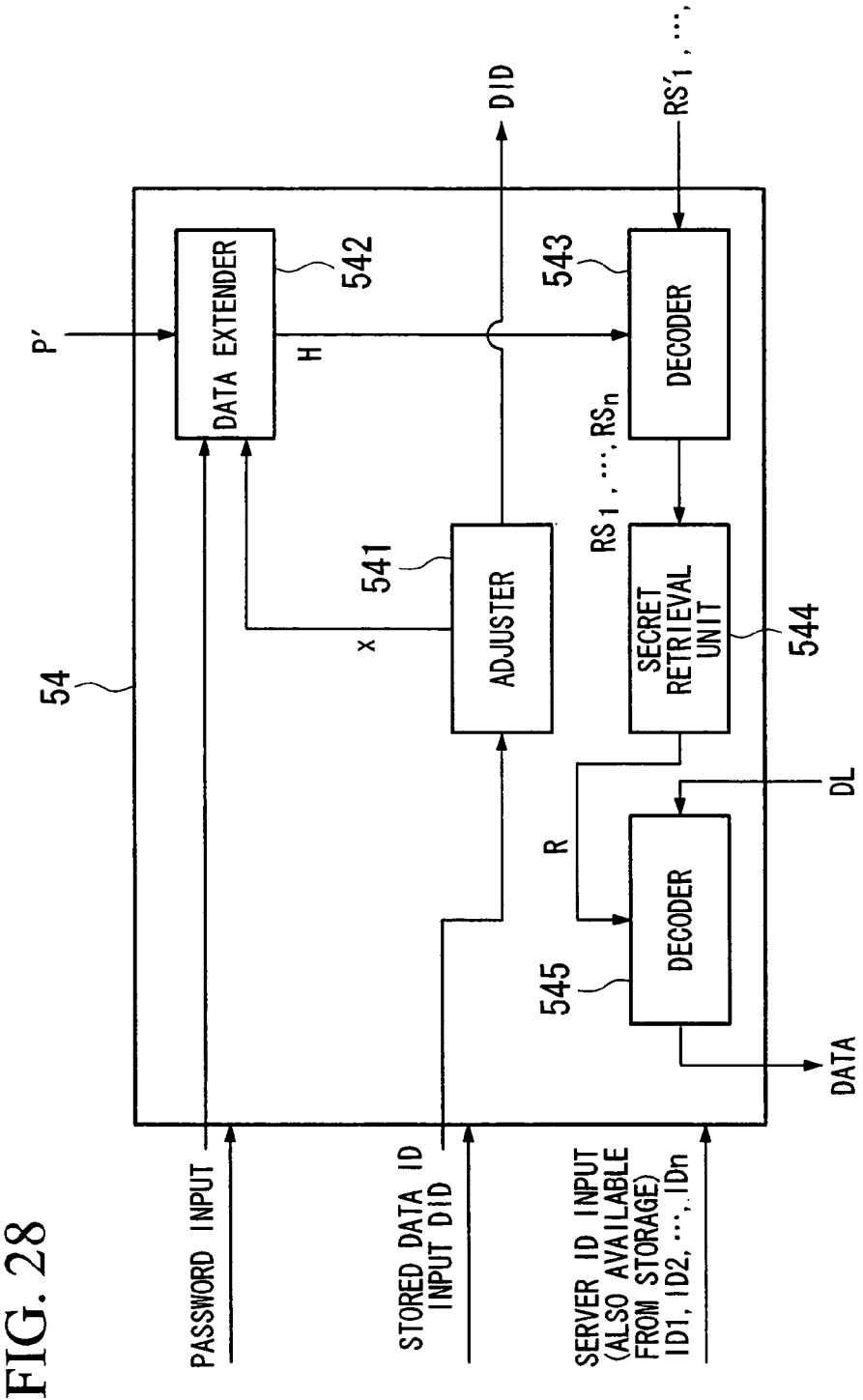
FIG. 28 is a block diagram showing the configuration of the data decoder 54 in FIG. 27.

Next, configuration of the data decoder 54 shown in FIG. 27 is described hereinafter with reference to FIG. 28. Here, only the different part from the configuration shown in FIG. 24 is described. An adjustor 541 generates an input x for a data extender 542 based on DID and supplies it to the data extender 542. The data extender 542 outputs a corresponding information H and supplies it to a decoder 543. The decoder 543 decodes encoded distributed data among the obtained RS'1, RS'2, ..., RS'n and supplies RS1, ..., RSn to a secret retrieval unit 544. The secret retrieval unit 544 restores DATA from the supplied distributed data sets using a decoder 545. Moreover, un-altered k distributed data can be supplied after error detection is conducted.

The authentication and key exchange processes can be executed by recording programs, for executing the functions of the processes shown in the figures, on a computer read/write recording medium and by loading and executing the programs recorded on the recording medium on a computer system. In this instance, the "computer system" includes OS or hardware such as peripheral devices. Moreover, the "computer system" includes WWW systems with website environments (or presentation environments). The "computer read/write recording medium" means portable media such as flexible discs, magnetic-optical discs, ROMs, CD-ROMs and storage devices such as hard disks contained in computer systems. Moreover, the "computer read/write recording medium" includes those that retain programs for a specified period of time such as volatile memory (RAM) in a server or client computer system when the programs are transferred via networks such as the Internet and communication lines such as telephone lines.

The above programs can be transferred from a computer system in the memory of which the programs are stored to other computer systems via transmission media or transmitted waves in the transmission media. In this instance, the "transmission media" means media having the function of transmitting information including networks (communication networks) such as the Internet and communication lines (communication wires) such as telephone lines. The above programs can be those that realize some of the described functions. Moreover, the programs can be so-called difference files (difference programs) that realize the described functions in a combination of programs recorded on computer systems.

INDUSTRIAL APPLICATIONS

With the present invention, a password cannot be found through off-line dictionary attacks even if stored information is leaked from the terminal or from the server so that it can prevent unauthorized use of the server. Moreover, the lack of tamper resistance module, used for protection of stored information from lost or stolen devices, makes the configuration simple as much as possible. There is no need to have a complex key management process such as a public key infrastructure, which can improve the computational process and simplify the overall process. In addition, extension to the multiple servers is easily realized.

A user ID is dynamically and synchronously changed between each server and the terminal so that it makes impossible for an eavesdropper to connect the privacy information of a user using a user ID.

What is claimed is:

1. An authentication system for mutual authentication between a terminal and a server wherein the terminal comprises:
    a memory means that pre-stores an authentication information P' for terminal storage;
    a concatenation means that yields a value P using a specific calculation formula in response to the input of the authentication information P' read from the memory means and a password entered for authentication;
    a mask operation means that yields a value Y1 using a specific calculation formula with the input value P and an internally generated random number, and then sends Y1 to the server; and
    a master key generation means that yields a value MK using a specific calculation formula with the input value P, an internally generated random number and a value Y2 received from a server that comprises:
    a memory means that pre-stores a password verification data H for server registration;
    a mask operation means that yields a value Y2 using a specific calculation formula with the input of the password verification data H read from the memory means and an internally generated random number, and then sends Y2 to the terminal; and
    a master key generation means that yields a value MK using a specific calculation formula with the input of the password verification data H, an internally generated random number and the value Y1 received from the terminal.

2. The authentication system according to claim 1 further comprising a data extension means that yields the password verification data H and the authentication information P' based on a password previously-determined by the user.

3. The authentication system according to claim 2 wherein the terminal comprises:
    a generation means that generates an update information T'; and
    an update information generation means that yields a password verification data H' for server update and a new authentication information P' using a specific calculation formula with the input of authentication information P' stored in the memory means and the update information T', sends the password verification data H' for server update to the server, and stores the new authentication information P' in the memory means,
    and the server comprises:
    an update information generation means that yields a new password verification data H using a specific calculation formula with the input of password verification data H' for server update sent from the terminal and password verification data H stored in the memory means, and then updates the password verification data H stored in the memory means.

4. The authentication system according to claim 2 wherein the terminal comprises:
    a generation means that generates a secret information S'; and
    an update information generation means that yields a password verification data H' for server update and a new authentication information P' using a specific calculation formula with the input of an authentication information P' stored in the memory means, the secret information S' and a new password, sends the password verification data H' for server update to the server, and then stores the new authentication information P' in the memory means,
    and the server comprises:
    an update information generation means that yields a new password verification data H using a specific calculation formula with the input of password verification data H' for server update sent from the terminal and password verification data H stored in the memory means, and then updates the password verification data H stored in the memory means.

5. The authentication system according to claim 1 wherein the terminal further comprises:
    an authentication result verification means that yields a value V1 using a specific calculation formula with the input of the value MK, sends V1 to the server and compares a value V2 received from the server with a value V2 obtained using a specific calculation formula with the input of the value MK and, if they match, authenticates the server,
    and the server further comprises:
    an authentication result verification means that yields a value V2 using a specific calculation formula with the input of the value MK, sends V2 to the terminal and compares a value V1 received from the terminal with a value V1 obtained using a specific calculation formula with the input of the value MK and, if they match, authenticates the terminal.

6. The authentication system according to claim 5 wherein each of the terminal and the server comprises a session key generation means that generates a session key when they are mutually authenticated.

7. The authentication system according to claim 1 wherein the authentication information P' is a polynomial equation.

8. The authentication system according to claim 1 wherein the authentication information P' is a polynomial equation and a hash function.

9. The authentication system according to claim 1 wherein the authentication information P' is a hash function.

10. The authentication system according to claim 1 wherein the authentication information P' is a pseudo random number generator.

11. A non-transitory computer readable storage medium storing an authentication program that runs on the terminal of an authentication system for mutual authentication between a terminal and a server wherein the program allows a computer to execute:
    a memory process to pre-store an authentication information P' for terminal storage;

a concatenation process to yield a value P using a specific calculation formula with the input of the stored authentication information P' and a password entered for authentication;

a mask operation process to yield a value Y1 using a specific calculation formula with the input value P and an internally generated random number, and then send Y1 to the server; and a master key generation process to yield a value MK using a specific calculation formula with the input value P, an internally generated random number and a value Y2 received from the server.

12. The non-transitory computer readable storage medium storing the authentication program according to claim 11 wherein the program further allows a computer to execute a data extension process to yield the authentication information P' based on a password previously-determined by the user.

13. The non-transitory computer readable storage medium storing the authentication program according to claim 11 wherein the program further allows a computer to execute an authentication result verification process to yield a value V1 using a specific calculation formula with the input of the value MK, send V1 to the server and compare a value V2 received from the server with a value V2 obtained using a specific calculation formula with the input of the value MK and, if they match, authenticate the server.

14. The non-transitory computer readable storage medium storing the authentication program according to claim 13 wherein each of the terminal and the server comprises a session key generation process to generate a session key when they are mutually authenticated.

15. The non-transitory computer readable storage medium storing the authentication program according to claim 11 wherein the authentication information P' is a polynomial equation.

16. The non-transitory computer readable storage medium storing the authentication program according to claim 11 wherein the authentication information P' is a polynomial equation and a hash function.

17. The non-transitory computer readable storage medium according to claim 11 wherein the authentication information P' is a hash function.

18. The non-transitory computer readable storage medium storing the authentication program according to claim 11 wherein the authentication information P' is a pseudo random number generator.

19. A non-transitory computer readable storage medium storing an authentication program that runs on the server of an authentication system for mutual authentication between a terminal and a server wherein the program allows a computer to execute:

a memory process to pre-store a password verification data H for server registration;

a mask operation process to yield a value Y2 using a specific calculation formula with the input of the stored password verification data H and an internally generated random number, and then send Y2 to the terminal; and a master key generation process to yield a value MK using a specific calculation formula with the input of the password verification data H, an internally generated random number and a value Y1 received from the terminal.

20. The non-transitory computer readable storage medium storing the authentication program according to claim 19 wherein the program further allows a computer to execute a data extension process to yield the password verification data H based on a password previously-determined by the user.

21. The non-transitory computer readable storage medium storing the authentication program according to claim 19 wherein the program further allows a computer to execute an authentication result verification process to yield a value V2 using a specific calculation formula with the input of the value MK, send V2 to the terminal and compare a value V1 received from the terminal with a value V1 obtained using a specific calculation formula with the input of the value MK and, if they match, to authenticate the terminal.

22. An authentication system for mutual authentication between a terminal and a server wherein the terminal comprises:

a memory means that pre-stores an authentication information P' for terminal storage and an RSA public key (N, e);

a concatenation means that yields a value W using a specific calculation formula with the input of the authentication information P' read from the memory means and a password entered for authentication; and a mask operation means that yields a value Z using a specific calculation formula with the input of the value W, RSA public key (N, e) read from the memory means and an internally generated random number T, and then sends Z to the server, and the server comprises:

a memory means that pre-stores a password verification data H for server registration and an RSA private key (N, d); and a master key generation means that yields a value T using a specific calculation formula with the input of the password verification data H and RSA private key (N, d) read from the memory means and a value Z received from the terminal.

23. The authentication system according to claim 22 wherein comprising a data extension means that yields the password verification data H and the authentication information P' based on a password previously-determined by the user.

24. The authentication system according to claim 23 wherein the terminal comprises:

a generation means that generates an update information T'; and an update information generation means that yields a password verification data H' for server update and a new authentication information P' using a specific calculation formula with the input of an authentication information P' stored in the memory means and the update information T', sends the password verification data H' for server update to the server, and stores the new authentication information P' in the memory means, and the server comprises:

an update information generation means that yields a new password verification data H using a specific calculation formula with the input of the password verification data H' for server update sent from the terminal and a password verification data H stored in the memory means, and then updates the password verification data H stored in the memory means.

25. The authentication system according to claim 23 wherein the terminal comprises:

a generation means that generates a secret information S'; and an update information generation means that yields a password verification data H' for server update and a new authentication information P' using a specific calculation formula with the input of authentication information P' stored in the memory means, the secret information S' and a new password, sends the password verification data H' for server update to the server, and then stores the new authentication information P' in the memory means, and the server comprises:

an update information generation means that yields a new password verification data H using a specific calculation formula with the input of password verification data H' for server update sent from the terminal and password verification data H stored in the memory means, and then updates the password verification data H stored in the memory means.

26. The authentication system according to claim 22 wherein comprising an RSA key generation means that yields the RSA public key (N, e) and the RSA private key (N, d).

27. The authentication system according to claim 22 wherein the terminal further comprises:

an authentication result verification means that compares a value V2 received from the server with a value V2 obtained using a specific calculation formula with the input of the random number T and, if they match, authenticates the server; and a verifier generation means that yields a value V1 using a specific calculation formula with the input of the random number T and sends V1 to the server, and the server further comprises:

a verifier generation means that yields a value V2 using a specific calculation formula with the input of the value T and sends V2 to the terminal; and an authentication result verification means that compares a value V1 received from the terminal with a value V1 obtained using a specific calculation formula with the input of the value T and, if they match, authenticates the terminal.

28. The authentication system according to claim 27 wherein each of the terminal and the server comprises a session key generation means that generates a session key when they are mutually authenticated.

29. The authentication system according to claim 22 wherein the authentication information P' is a polynomial equation and an FDH function.

30. The authentication system according to claim 22 wherein the authentication information P' is an FDH function.

31. The authentication system according to claim 22 wherein the RSA public key (N, e) uses secure communication.

32. The authentication system according to claim 22 wherein the RSA public key (N, e) uses insecure communication.

33. The authentication system according to claim 22 wherein the terminal comprises:

an update information generation means that yields a new authentication information P' using a specific calculation formula with the input of an authentication information P' stored in the memory means and the random number T, and then stores the new authentication information P' in the memory means, and the server comprises:

an update information generation means that yields a new password verification data H using a specific calculation formula with the input of a password verification data H stored in the memory means and a value T yielded by the master key generation means, and then updates the password verification data H stored in the memory means.

34. A non-transitory computer readable storage medium storing an authentication program that runs on a terminal of an authentication system for mutual authentication between a terminal and a server wherein the program allows a computer to execute:

a memory process to pre-store an authentication information P' for terminal storage and an RSA public key (N, e);

a concatenation process to yield a value W using a specific calculation formula with the input of the stored authentication information P' and a password entered for authentication; and a mask operation process to yield a value Z using a specific calculation formula with the input of the value W, the stored RSA public key (N, e), and an internally generated random number T, and then send Z to the server.

35. The non-transitory computer readable storage medium storing the authentication program according to claim 34 wherein the program further allows a computer to execute a data extension process to yield authentication information P' based on a password previously-determined by the user.

36. The non-transitory computer readable storage medium storing the authentication program according to claim 34 wherein the program further allows a computer to execute an RSA key generation process to yield the RSA public key (N, e).

37. The non-transitory computer readable storage medium storing the authentication program according to claim 34 wherein the program further allows a computer to execute:

an authentication result verification process to compare a value V2 received from the server with a value V2 obtained using a specific calculation formula with the input of the random number T and, if they match, authenticate the server; and a verifier generation process to yield a value V1 using a specific calculation formula with the input of the random number T and send V1 to the server.

38. The non-transitory computer readable storage medium storing the authentication program according to claim 37 wherein each of the terminal and the server comprises a session key generation process to generate a session key when they are mutually authenticated.

39. The non-transitory computer readable storage medium storing the authentication program according to claim 34 wherein that the authentication information P' is a polynomial equation and an FDH function.

40. The non-transitory computer readable storage medium storing the authentication program according to claim 34 wherein the authentication information P' is an FDH function.

41. The non-transitory computer readable storage medium storing the authentication program according to claim 34 wherein the RSA public key (N, e) uses secure communication.

42. The non-transitory computer readable storage medium storing the authentication program according to claim 34 wherein the RSA public key (N, e) uses insecure communication.

43. A non-transitory computer readable storage medium storing an authentication program that runs on a server of an authentication system for mutual authentication between a terminal and a server wherein the program allows a computer to execute:

a memory process to pre-store a password verification data H for server registration and an RSA private key (N, d); and a master key generation process to yield a value T using a specific calculation formula with the input of the stored password verification data H, RSA private key (N, d) and a value Z, wherein the value Z represents a result of a specific calculation formula with the input of a concatenation process that yields a value W, a public key (N,e) and an internally generated random number and received from the terminal.

44. The non-transitory computer readable storage medium storing the authentication program according to claim 43 wherein the program further allows a computer to execute a data extension process to yield the password verification data H based on a password previously-determined by the user.

45. The non-transitory computer readable storage medium storing the authentication program according to claim 43 wherein the program further allows a computer to execute an RSA key generation process to yield the RSA private key (N, d).

46. The non-transitory computer readable storage medium storing the authentication program according to claim 43 wherein the program further allows a computer to execute:
  a verifier generation process to yield a value V2 using a specific calculation formula with the input of the value T and send V2 to the terminal; and
  an authentication result verification process to compare a value V1 received from the server with a value V1 obtained using a specific calculation formula with the input of the value T and, if they match, to authenticate the terminal.

47. A remotely-distributed storage system that conducts mutual authentication between a terminal and multiple servers, distributes terminal data to be stored, and stores them on the servers wherein the terminal comprises:
  a data extension means that yields a password verification data H for server registeratioin and an authentication information P' for terminal storage based on a password previously-determined by the user;
  a memory means that pre-stores the authentication information P' yielded by the data extension means;
  a concatenation means that yields a value P using a specific calculation formula with the input of the authentication information P' read from the memory means and a password entered for authentication;
  a mask operation means that yields a value Y1 using a specific calculation formula with the input value P and an internally generated random number, and then sends Y1 to the server;
  a master key generation means that yields a value MK using a specific calculation formula with the input of the value P, an internally generated random number and a value Y2 received from the server;
  an authentication result verification means that yields a value V1 using a specific calculation formula with the input of the value MK, sends V1 to the server and compares a value V2 received from the server with the value V1 and, if they match, authenticates the server;
  a session key generation means that generates the same number of session keys SK as the number of servers when the servers are authenticated;
  a data dividing means that divides the data to be stored and yields the same number of divided data as the number of authenticated servers;
  a data storing means that encodes the divided data and an identification information for identifying the data to be stored using the session keys SK shared with the storing servers, and then sends them to the servers; and
  a data decoding means that receives the divided data from the servers where the data are stored, and then decodes the stored data,
  and the server comprises:
  a memory means that pre-stores a password verification data H yielded by the data extension means;
  a mask operation means that yields a value Y2 using a specific calculation formula with the input of a password verification data H read from the memory means and an internally generated random number, and then sends Y2 to the terminal;
  a master key generation means that yields a value MK using a specific calculation formula with the input of the password verification data H, an internally generated random number and a value Y1 received from the terminal;
  an authentication result verification means that yields a value V2 using a specific calculation formula with the input of the value MK, sends Y2 to the terminal and compares a value V1 received from the terminal with the value V2 and, if they match, authenticates the terminal;
  a session key generation means that generates a session key SK when the terminal is authenticated;
  a data receiving means that receives divided data from the terminal;
  a data storing means that stores the divided data; and
  a data transfer means that reads the divided data stored in the data storing means and sends them to the terminal.

48. The remotely-distributed storage system according to claim 47 wherein that some of the divided data are stored on the terminal.

49. A non-transitory computer readable storage medium storing a remotely-distributed storage program that runs on a terminal of a remotely-distributed storage system that conducts mutual authentication between a terminal and multiple servers, distributes terminal data to be stored, and stores them on the servers wherein the program allows a computer to execute:
  a data extension process to yield a password verification data H for server registration and an authentication information P' for terminal storage based on a password previously-determined by the user;
  a memory process to pre-store the authentication information P' yielded in the data extension process;
  a concatenation process to yield a value P using a specific calculation formula with the input of the authentication information P' read from the memory process and a password entered for authentication;
  a mask operation process to yield a value Y1 using a specific calculation formula with the input of value P and an internally generated random number, and then send Y1 to the server;
  a master key generation process to yield a value MK using a specific calculation formula with the input of the value P, an internally generated random number and a value Y2 received from the server;
  an authentication result verification process to yield a value V1 using a specific calculation formula with the input of the value MK, send V1 to the server and compare a value V2 received from the server with the value V1 and, if they match, authenticate the server;
  a session key generation process to generate the same number of session keys SK as the number of servers when the servers are authenticated;
  a data dividing process to divide the data to be stored and yield the same number of divided data as the number of authenticated servers;
  a data storing process to encode the divided data and an identification information for identifying the data to be stored using the session keys SK shared with the storing servers, and then send them to the servers; and a data decoding process to receive the divided data from the servers where the data are stored, and then decode the stored data.

50. A non-transitory computer readable storage medium storing a remotely-distributed storage program that runs on a server of a remotely-distributed storage system that conducts mutual authentication between a terminal and multiple servers, distributes terminal data to be stored, and stores them on the servers wherein the program allows a computer to execute:

a memory process to pre-store a password verification data H yielded in a data extension process;

a mask operation process to yield a value Y2 using a specific calculation formula with the input of a password verification data H read from the memory process and an internally generated random number, and then send Y2 to the terminal;

a master key generation process to yield a value MK using a specific calculation formula with the input of the password verification data H, an internally generated random number and a value Y1 received from the terminal;

an authentication result verification process to yield a value V2 using a specific calculation formula with the input of the value MK, send V2 to the terminal and compare a value V1 received from the terminal with the value V2 and, if they match, to authenticate the terminal;

a session key generation process to generate a session key SK when the terminal is authenticated;

a data receiving process to receive divided data from the terminal;

a data storing means to store the divided data; and a data transfer process to read the divided data stored in the data storing process and send them to the terminal.

\* \* \* \* \*